(12) United States Patent
Nakata et al.

(10) Patent No.: US 12,298,140 B2
(45) Date of Patent: May 13, 2025

(54) SYSTEM FOR CORRECTING AN OBJECT POSITION LOCATION RELATIVE TO A VEHICLE BASED ON A SENSOR REMOTE FROM THE VEHICLE

(71) Applicant: HITACHI ASTEMO, LTD., Ibaraki (JP)

(72) Inventors: Hiroaki Nakata, Tokyo (JP); Shoji Muramatsu, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 459 days.

(21) Appl. No.: 17/428,495

(22) PCT Filed: Feb. 6, 2020

(86) PCT No.: PCT/JP2020/004481
§ 371 (c)(1),
(2) Date: Aug. 4, 2021

(87) PCT Pub. No.: WO2020/189069
PCT Pub. Date: Sep. 24, 2020

(65) Prior Publication Data
US 2022/0099445 A1 Mar. 31, 2022

(30) Foreign Application Priority Data
Mar. 20, 2019 (JP) ................. 2019-052098

(51) Int. Cl.
*B60R 11/02* (2006.01)
*G01C 21/00* (2006.01)
(Continued)

(52) U.S. Cl.
CPC ......... *G01C 21/32* (2013.01); *G01C 21/3841* (2020.08); *G01C 21/3889* (2020.08); *G08G 1/166* (2013.01); *H04W 4/40* (2018.02)

(58) Field of Classification Search
CPC ............... G01C 21/32; G01C 21/3841; G01C 21/3889; G08G 1/166
See application file for complete search history.

(56) References Cited

U.S. PATENT DOCUMENTS

2018/0032086 A1  2/2018  Punithan et al.
2018/0075750 A1  3/2018  Takamura et al.
(Continued)

FOREIGN PATENT DOCUMENTS

JP   H07-286858 A   10/1995
JP   2009-150711 A   7/2009
(Continued)

OTHER PUBLICATIONS

WO2007028624—Machine Translation—TARTER (Year: 2007).*
Partial Supplementary European Search Report issued on Aug. 23, 2022 for European Patent Application No. 20773709.9.

*Primary Examiner* — Jess Whittington
*Assistant Examiner* — Rami Nabih Bedewi

(57) ABSTRACT

An outside sensing information processing device for suppressing adverse influence on warning of an advanced vehicle safety system. The vehicle safety system receives position information of an object detected by another vehicle or a road, the positions of feature points of a stationary object, and configuration information of an environmental map. When the system receives the information, the position of the object on the environmental map is calculated. Another vehicle also transmits position information of itself. The present vehicle checks an error of the position information of the vehicle detected by the other vehicle from the position information of the another vehicle and the relation of the position of a feature point detected by the another vehicle and the position of the feature point detected by the (Continued)

present vehicle. In the case where the error is large or unstable, use of the position information from the other vehicle is avoided.

13 Claims, 15 Drawing Sheets

(51) Int. Cl.
    *G01C 21/30*     (2006.01)
    *G01C 21/32*     (2006.01)
    *G08G 1/09*     (2006.01)
    *G08G 1/16*     (2006.01)
    *G09B 29/10*     (2006.01)
    *H04W 4/40*     (2018.01)

(56) References Cited

U.S. PATENT DOCUMENTS

2018/0151071 A1*  5/2018  Park ........................ G01S 19/40
2019/0329768 A1* 10/2019  Shalev-Shwartz ...........................
                                                         B60W 30/18163
2019/0371178 A1* 12/2019  Fukami .................. G08G 1/166

FOREIGN PATENT DOCUMENTS

| JP | 2015-125669 A | | 7/2015 | |
|---|---|---|---|---|
| JP | 2018-081609 A | | 5/2018 | |
| WO | WO2007028624 | * | 9/2006 | ............ B61L 25/025 |

* cited by examiner

FIG.7

| POSITION INFORMATION NUMBER | SENSOR ID | LONGITUDE OFFSET [DEGREES] | LATITUDE OFFSET [DEGREES] | ALTITUDE OFFSET [m] | OBJECT ID | KIND | WIDTH [m] | HEIGHT [m] | RELIABILITY |
|---|---|---|---|---|---|---|---|---|---|
| 1 | 1 | -6.6e-5 | 1.9e-5 | 0.00 | REFERENCE 1 ID1 | INTERSECTION MARK | 0 | 0 | HIGH |
| 2 | 1 | -6.9e-5 | 1.9e-5 | 0.00 | REFERENCE 1 ID2 | INTERSECTION MARK | 0 | 0 | MIDDLE |
| 3 | 1 | -6.9e-5 | 1.6e-5 | 0.00 | REFERENCE 1 ID3 | INTERSECTION MARK | 0 | 0 | MIDDLE |
| 4 | 1 | -6.6e-5 | 1.9e-5 | 0.00 | REFERENCE 1 ID4 | INTERSECTION MARK | 0 | 0 | HIGH |
| 5 | 1 | -11.8e-5 | 2.1e-5 | 0.78 | OBJECT 1 ID1 | BICYCLE | 0.51 | 0 | MIDDLE |
| 6 | 1 | -12.8e-5 | 2.4e-5 | 1.10 | OBJECT 1 ID2 | BICYCLE | 0 | 0 | MIDDLE |
| 7 | 1 | -12.9e-5 | 1.8e-5 | 1.15 | OBJECT 1 ID3 | BICYCLE | 0 | 0 | MIDDLE |

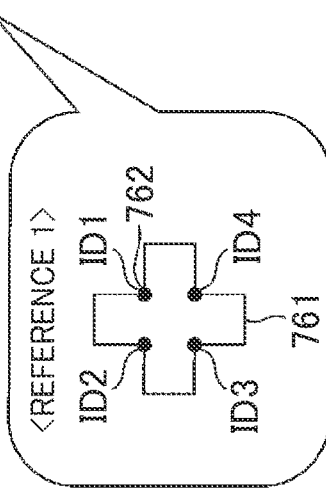

<REFERENCE 1>
ID2 ID1 762
ID3 ID4 761

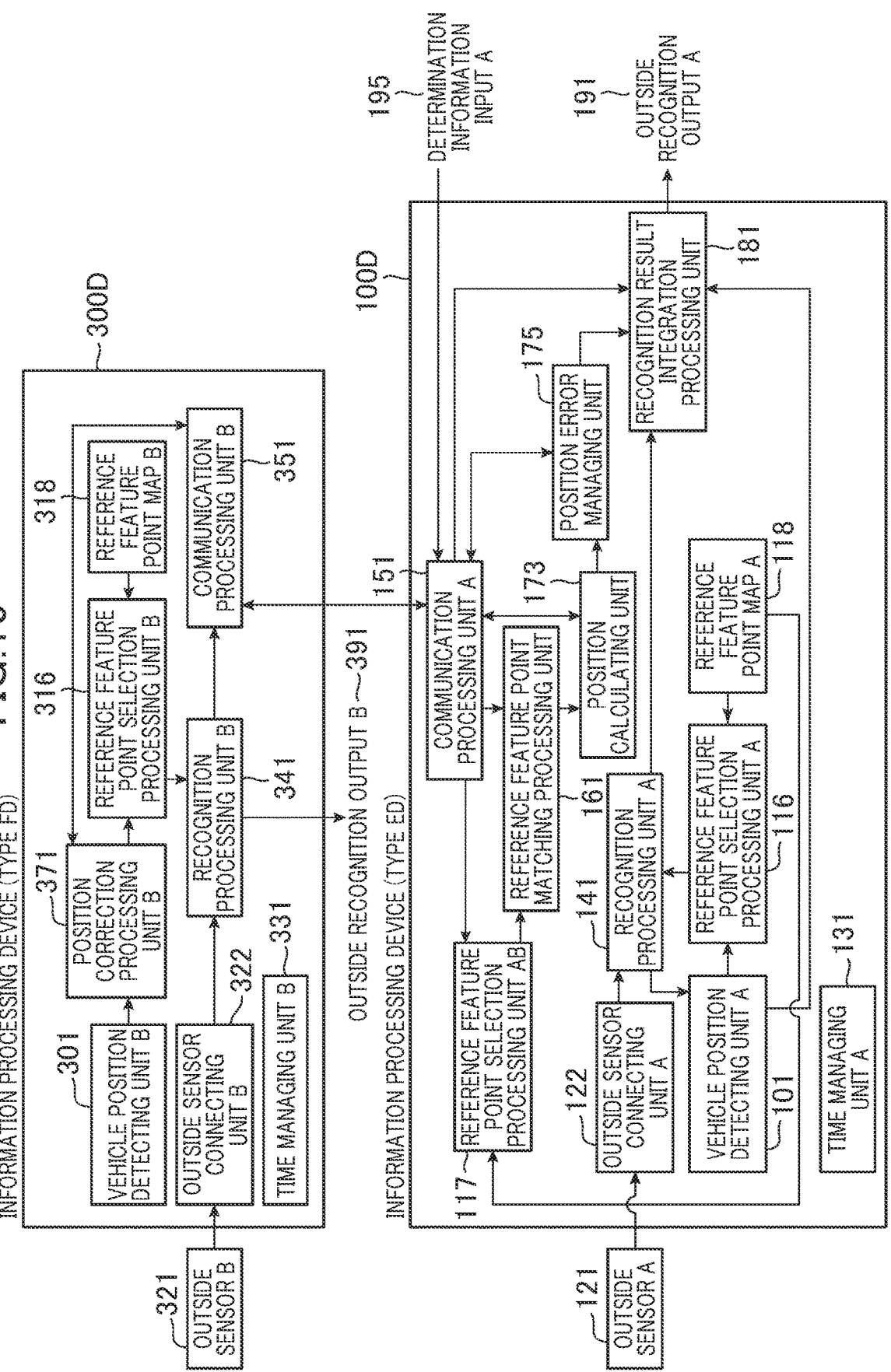

SYSTEM FOR CORRECTING AN OBJECT POSITION LOCATION RELATIVE TO A VEHICLE BASED ON A SENSOR REMOTE FROM THE VEHICLE

TECHNICAL FIELD

The present invention relates to an outside sensing information processing device and relates to an outside sensing information processing device mainly as a component of an advanced safety system or an automatic driving system of a vehicle, which senses the situation of the outside by utilizing also outside sensing information of something other than a vehicle in which the device mounted (hereinbelow, called present vehicle), and detects or recognizes an object which exerts an influence on the vehicle travel.

BACKGROUND ART

In recent years, a vehicle in which an advanced safety system which automatically performs brake operation and the like at the time of emergency to avoid collision or reduce damage at the time of collision is mounted is being spread. A vehicle (automatic driving car) in which an automatic driving system capable of making the vehicle autonomously move is mounted is realized at an experimental level or under limited conditions. In an advanced safety system and an automatic driving system, usually, to recognize a situation of the outside of a vehicle, an outside sensor such as a camera and a radar, a laser range finder (Lidar), or a sonar and a signal processing device processing sensing data obtained by the outside sensor and detecting an object and a situation in the circumferential area are mounted. However, there are objects difficult to be detected by an outside sensor of a vehicle depending on the situation of the circumferential area and the distance from the vehicle. To detect and recognize those objects, there is a method of using information obtained by an outside sensor which is provided for something other than a present vehicle by communicating with a device mounted on a road or the like or another vehicle. As a method of using information obtained by an outside sensor of another vehicle, patent literature 1 discloses a method of obtaining position information of an object detected by another vehicle, converting position information of an object detected by the another vehicle to position information for the present vehicle by grasping the positional relation between the present vehicle and the another vehicle by detecting the position of the another vehicle by an outside sensor of the present vehicle, and using the converted information.

CITATION LIST

Patent Literature

Patent literature 1: Japanese Unexamined Patent Application Publication No. 2018-81609

SUMMARY OF INVENTION

Technical Problem

However, in the method disclosed in the patent literature 1, the position of another vehicle has to be recognized by the outside sensor of the present vehicle. Since it is a precondition that the another vehicle can be observed from the present vehicle, information of another vehicle which cannot be observed from the present vehicle cannot be used. There is a method of obtaining the position of the another vehicle by the present vehicle by transmitting the position in a map of the another vehicle which is recognized by the another vehicle from the another vehicle to the present vehicle. However, the precision of obtaining a position in a map varies among vehicles and there is a case that, depending on a situation, the position in a map of the another vehicle becomes inaccurate. Therefore, when the position in the map of the another vehicle transmitted from the another vehicle is used as it is as a reference, there is the possibility that precision of position information of an object detected by the another vehicle is low so that the operation of an advanced safety system or an automatic driving system performing warning and vehicle control is not properly performed depending on the position of an object. For example, calculation of a collision prediction time to an obstacle becomes inaccurate, and there is the possibility such that an unnecessary hard brake is activated or a brake is weak and it becomes difficult to avoid collision. Since the position in a map is used, in the case where there is a deviation between the map of a present vehicle and the map of another vehicle, when position information of an object detected by the another vehicle is used using the position of the another vehicle transmitted from the another vehicle as a reference and the object is set as it is in the map of the present vehicle, the object may be set in a deviated place in the map of the present vehicle. As a result, there is the possibility that the operation of an advanced safety system or an automatic driving system performing warning and vehicle control cannot be properly performed.

The present invention has been achieved in consideration of the problem as described above and an object of the invention is to provide an outside sensing information processing device capable of suppressing the adverse influence on warning and vehicle control of an advanced safety system and an automatic driving system, at the time of using position information of an object detected by another vehicle, by suppressing a position error at the time of reflecting the existence of the object into a map of a present vehicle, verifying position information precision of the another vehicle, and avoiding use of the information of the another vehicle depending on a situation.

Solution to Problem

To achieve the object, an outside sensing information processing device according to the present invention, which detects position of an object or an indication existing on the outside of a first moving object, is characterized by including: a receiving function of receiving configuration information of an environmental map as a reference of a position, which is extracted from sensing information by an outside sensor mounted in a second moving object or a stationary object; a matching function of matching configuration information of the environmental map obtained by the receiving function and configuration information of an environmental map obtained by the function of the sensing information processing device; and a correcting function, by using a matching result of the matching function, of correcting position information of an object or an indication existing on the outside detected by an outside sensor mounted in the second moving object or the stationary object.

An outside sensing information processing device according to the present invention, which detects position of an object or an indication existing on the outside of a first moving object, is characterized by having: a receiving function of receiving configuration information of an environmental map as a position reference, which is extracted from sensing information obtained by an outside sensor mounted in a second moving object or a stationary object and position information of the second moving object or the stationary object; a matching function of matching configuration information of the environmental map obtained by the receiving function and configuration information of an environmental map obtained by the function of the sensing information processing device; a position calculating function of calculating the position of the second moving object or stationary object by using a matching result of the matching function; and an error detecting function of detecting an error of a position of the second moving object or the stationary object recognized by the second moving object or the stationary object by comparing a calculation result of the position calculating function and position information of the second moving object or the stationary object obtained by the receiving function.

Advantageous Effects of Invention

According to the present invention, for example, at the time of transmitting position information of an object or an indication detected by an outside sensor mounted in another vehicle (which may be an outside sensor such as a camera installed on a road), the positions of feature points of an object (stationary object) and an indication as configuration information of an environmental map as a reference of a position are also detected and transmitted. When a present vehicle receives those pieces of information, the position of the object or indication on the environmental map of the present vehicle is calculated (corrected) on the basis of the relative position relation between position information of an object or indication as a target and the positions of feature points and the positions of the feature points grasped by the present vehicle.

Another vehicle transmits also position information of itself, and the present vehicle recognizes an error of the position information of the another vehicle grasped by the another vehicle from the received position information of the another vehicle and the relation between the position of a feature point detected by the another vehicle and the position of the feature point detected by itself and, when the error is large or in an unstable case, avoids use of the position information from the another vehicle.

As described above, in the present invention, the position of an object or an indication detected by an outside sensor mounted in another vehicle is calculated on the basis of a feature point detected by the outside sensor mounted in another vehicle, so that a detection result of the outside sensor mounted in another vehicle can be used also in a situation where the another vehicle and the like cannot be detected from the present vehicle. In addition, since the position of an object or an indication detected by an outside sensor mounted in another vehicle is calculated using, as a reference, the position of a feature point grasped by the present vehicle, the position precision at the time of reflecting the position of an object or an indication detected by an outside sensor mounted in another vehicle into a map of the present vehicle improves.

By comparing the position of another vehicle detected by the another vehicle itself and the position of the outside sensor mounted in the another vehicle calculated by the present vehicle, the position precision of the another vehicle is grasped. In such a manner, another vehicle which is improper for position information use can be detected. Consequently, by limiting use of the position information of a detected object or indication provided by the another vehicle and the position information of the another vehicle detected by the another vehicle itself, the adverse influence on the operation of the advanced safety system and the automatic driving system can be suppressed.

The other objects, configurations, and effects will become apparent by the following description of embodiments.

BRIEF DESCRIPTION OF DRAWINGS

FIG. 7 illustrates an example of position information transmitted by the information processing device (type FA).

FIG. 16 illustrates a functional block configuration example of an information processing device (type FD) and an information processing device (type ED) of a fourth embodiment.

DESCRIPTION OF EMBODIMENTS

Hereinafter, embodiments of an outside sensing information processing device (hereinbelow, also simply called information processing device) of the present invention will be described with reference to the drawings.

First Embodiment

A situation of applying a first embodiment of the present invention will be described by using FIG. 1.

Figure 1:
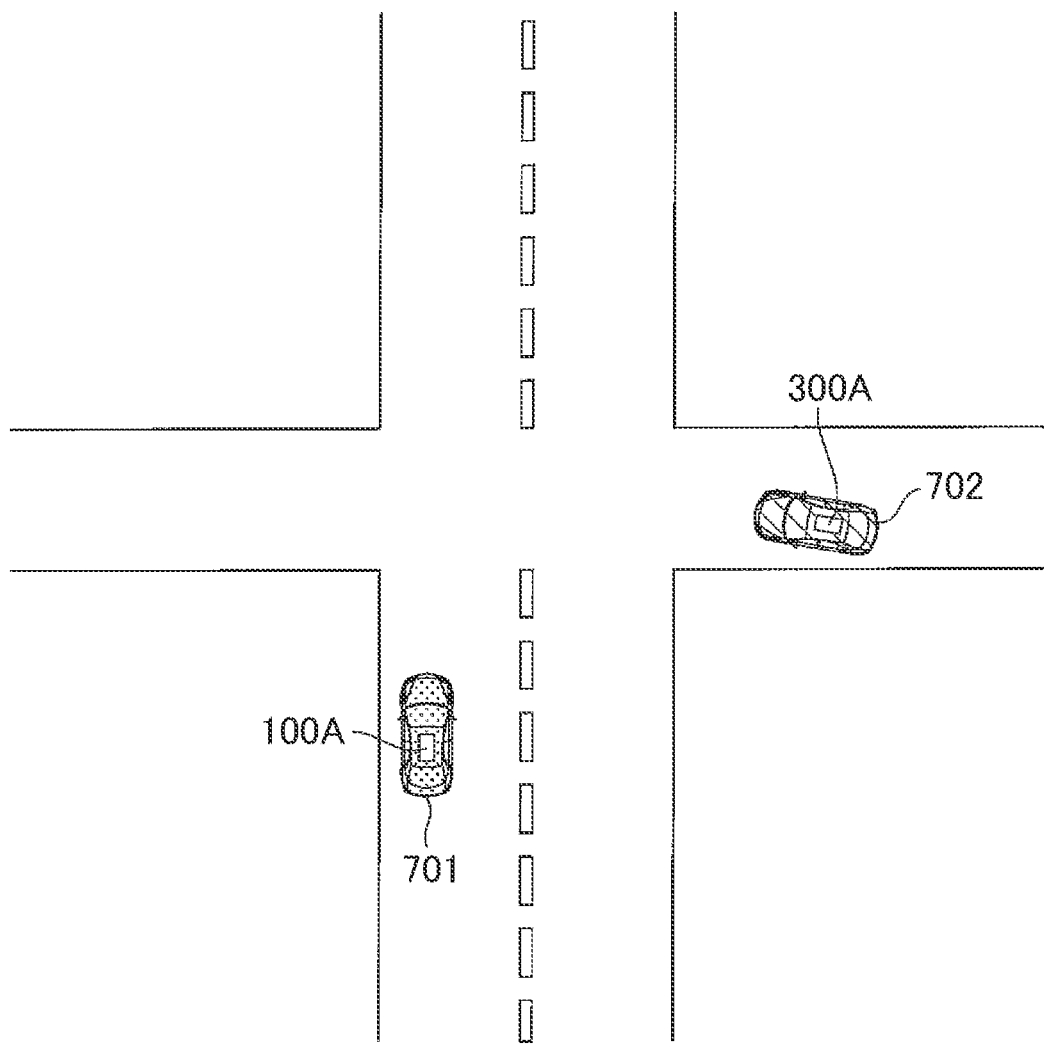
FIG. 1 illustrates an example of a situation of a vehicle in which an information processing device of a first embodiment is mounted.

As illustrated in FIG. 1, in the embodiment, a first outside sensing information processing device 100A mounted in a vehicle 701 (hereinafter, also called the present vehicle) performs communication with a second outside sensing information processing device 300A mounted in a different vehicle 702 (hereinafter, also called another vehicle), integrates a recognition result of the outside sensing of the second outside sensing information processing device 300A, and outputs outside recognition (that is, position detection of an object or an indication existing outside of the vehicle 701 or the like).

A configuration example of hardware of the first embodiment of the present invention, that is, a configuration example of hardware in which the first and second outside sensing information processing devices 100A and 300A illustrated in FIG. 1 will be described by using FIG. 2.

Figure 2:
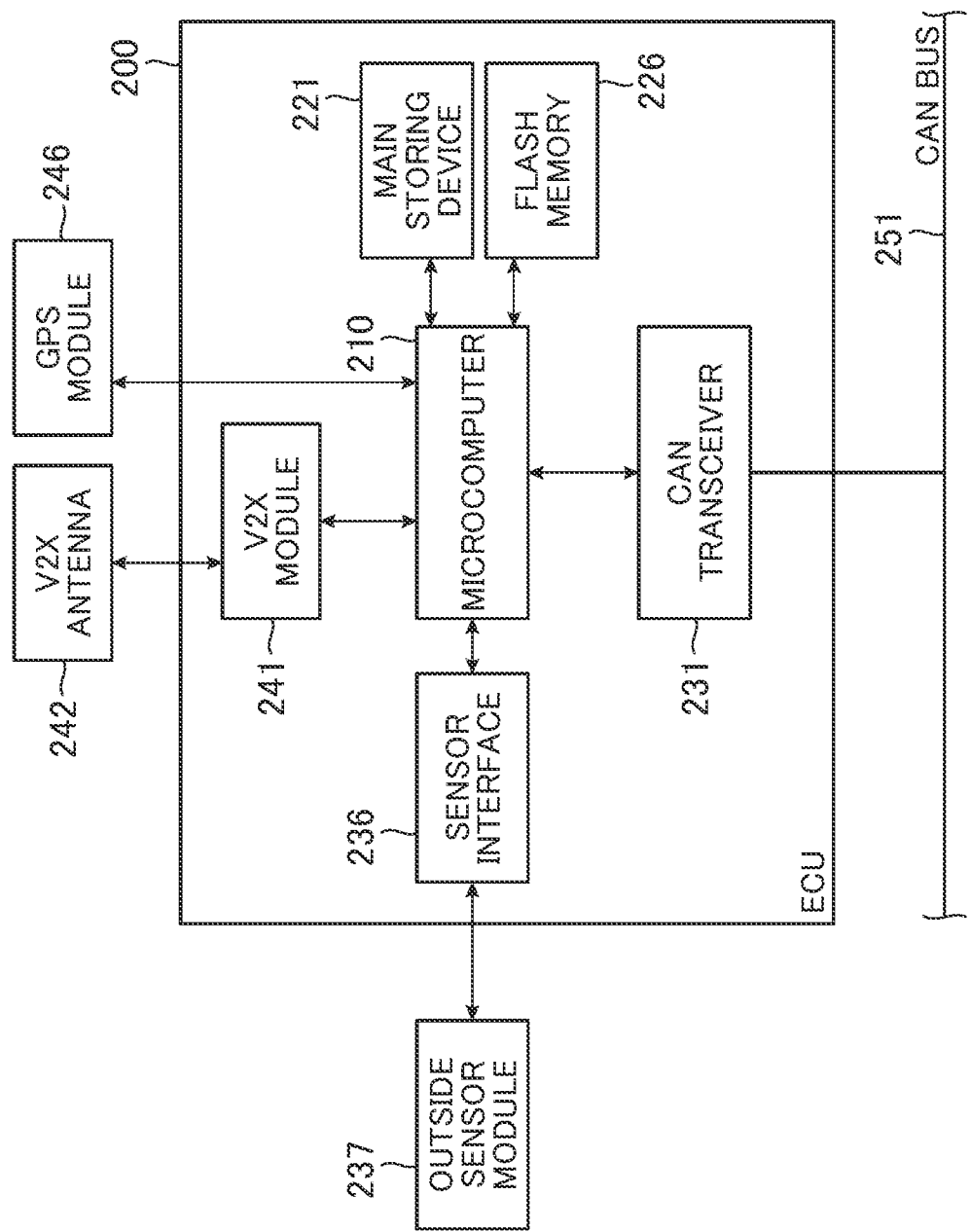
FIG. 2 illustrates a hardware configuration example of the information processing device of the first embodiment.

As illustrated in FIG. 2, the hardware in which the information processing device 100A or 300A of the embodiment is mounted is configured by an ECU (Electronic Control Unit) 200 performing main processes and an outside sensor module 237, a V2X antenna 242, and a GPS module 246 connected to the ECU 200. A CAN bus 251 is connected to communicate with another ECU. In place of the CAN bus 251, another connection signal (such as an in-vehicle LAN) may be used. Both the connection signals and the CAN bus 251 may be also used.

The ECU 200 has therein a microcomputer 210, a main storing device 221, a flash memory 226, a CAN transceiver 231, a sensor interface 236, and a V2X module 241.

The microcomputer 210 is a device executing software for realizing various functions, transmits/receives information to/from the connected devices on the basis of an instruction of a program, and processes the information.

The flash memory 226 is used to hold data necessary for the software which is executed by the microcomputer 210 and data necessary for the microcomputer 210, which has to be stored even when the power supply is disconnected.

The main storing device 221 is a storing device used to make the software operate by the microcomputer 210 and temporarily hold data. As the main storing device 221, a RAM (Random Access Memory) is usually used.

The CAN transceiver 231 is a device for adjusting mainly electric characteristics when the microcomputer 210 performs communication via the CAN bus 251. The sensor interface 236 is an interface used by the microcomputer 210 to communicate with the outside sensor module 237 mounted in the vehicle and is, for example, a device for performing a high-speed serial communication.

The outside sensor module 237 is a module in which an outside sensor such as an in-vehicle camera and a function of converting a signal obtained by the outside sensor to a signal adapted to the sensor interface 236 are integrated. The outside sensor module 237 may also have a recognition process function or the like.

There is also a case that communication with the microcomputer 210 is performed via the CAN bus 251 without using the sensor interface 236 which is prepared to connect the outside sensor module 237 to the microcomputer 210. Hereinafter, the outside sensor module 237 itself including an outside sensor sensing (detecting) the situation of the outside is also simply called an outside sensor.

The V2X module 241 is a device for allowing the microcomputer 210 to communicate with other vehicles and facilities on roads and is a device for performing wireless communication by connecting the V2X antenna 242 as an antenna for V2X communication on the outside of the ECU 200.

The GPS module 246 connected to the microcomputer 210 is a device for allowing the microcomputer 210 to obtain present time and present position. The GPS module 246 receives radio waves from a GPS satellite by an internal antenna and, further, analyzes a reception signal by an LSI to obtain the position and time.

Since the functional differences of the information processing devices 100A and 300A of the embodiment relate to the differences in software operated by the microcomputer 210, the differences in the processing capability of the microcomputer 210, the differences in the capacities of the main storing device 221 and the flash memory 226 used to store and process the software and data, the differences of the outside sensor module 237 and the like, the hardware configuration of the information processing devices 100A and 300A is as illustrated in FIG. 2.

Figure 3:
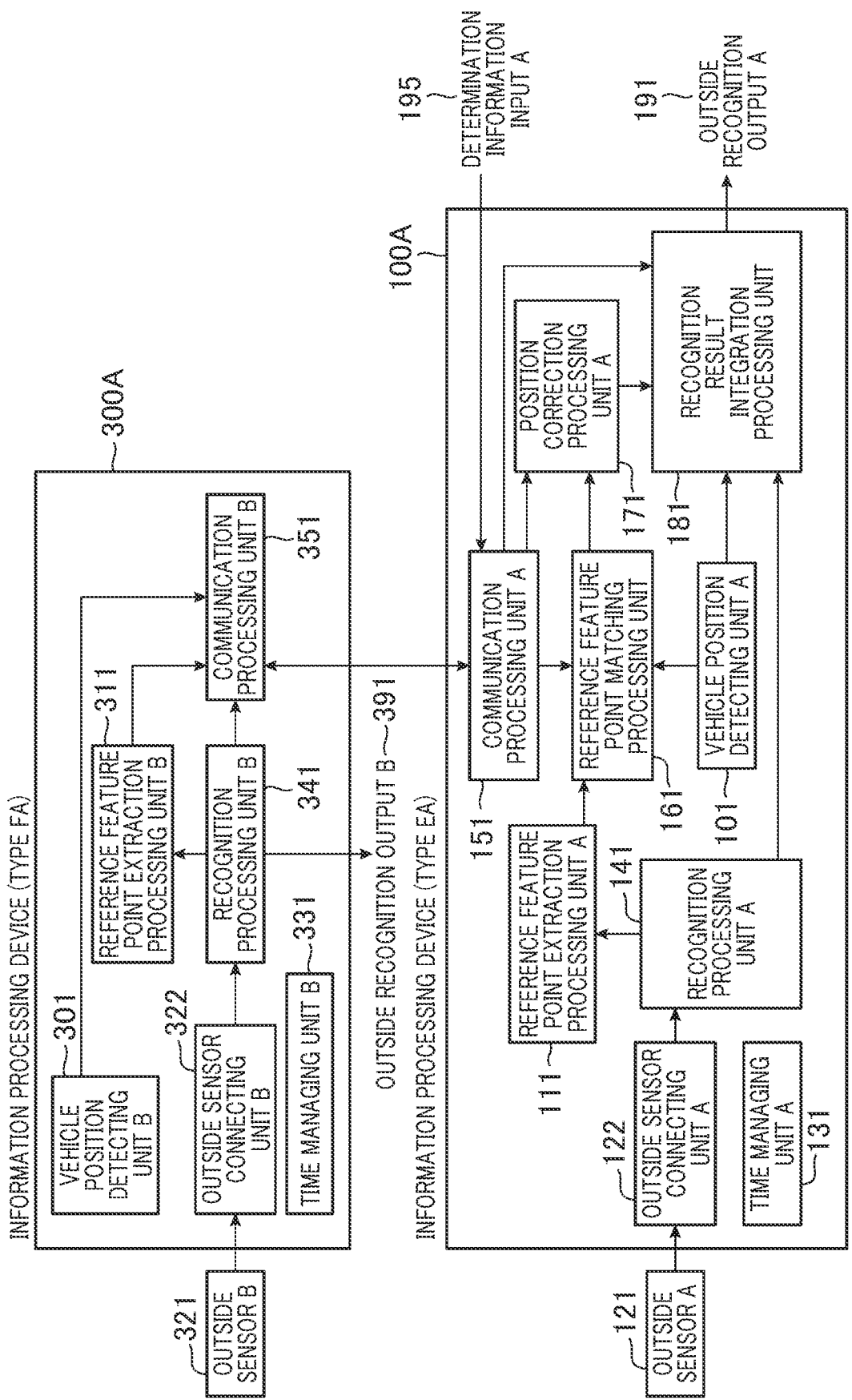
FIG. 3 illustrates a function block configuration example of an information processing device (type FA) and an information processing device (type EA) of the first embodiment.

A configuration example of function blocks of the first embodiment of the present invention will be described by using FIG. 3. The first outside sensing information processing device 100A mounted in the vehicle (present vehicle) 701 in FIG. 1 corresponds to the information processing device (type EA) 100A in FIG. 3, and the second outside sensing information processing device 300A mounted in the vehicle (another vehicle) 702 in FIG. 1 corresponds to the information processing device (type FA) 300A in FIG. 3.

The information processing device (type FA) 300A has a time managing unit B 331 managing time of the entire device, a vehicle position detecting unit B 301 having the functions corresponding to a navigation system in which a GPS and the like are mounted and obtaining the position and the orientation on a map of the vehicle in which the device is mounted, an outside sensor connecting unit B 322 obtaining sensing information by an outside sensor B 321 sensing the situation of the outside by communication, a recognition processing unit B 341 detecting an object and an indication such as a figure and characters existing on the outside from the sensing information obtained by the outside sensor B 321 via the outside sensor connecting unit B 322 and recognizing relative position and orientation using the outside sensor B 321 as a reference, a reference feature point extraction processing unit B 311 extracting feature points (hereinafter, called reference feature points) of a stationary object and an indication which can be configuration information of an environmental map of the circumferential area and can be used as position references on the map from the result of recognition of the recognition processing unit B 341, and a communication processing unit B 351 performing communication with the information processing device (type EA) 100A mounted in a different vehicle.

The time managing unit B 331 has a function of suppressing an error within one millisecond by, for example, obtaining synchronization with time information of the GPS every one hour at maximum and, if precision cannot be assured for a reason such that the time information of the GPS cannot be obtained for long time and synchronization cannot be obtained, notifying the fact to each of the components of the information processing device (type FA) 300A and to another information processing device which receives information from the information processing device (type FA) 300A via the communication processing unit B 351. In the case of using the GPS, the time managing unit B 331 may share the GPS signal receiving function with the vehicle position detecting unit B 301.

As the outside sensor B 321, although use of a camera, a laser range finder, a millimeter-wave radar, an ultrasonic sensor (sonar), or the like is assumed, another sensor may be used as long as the sensor can sense the situation of the outside. At the time of outputting sensing information, the outside sensor B 321 adds time (sensing time) at which sensing is executed.

At the time of integrating outside sensing results by various outside sensors, to correct changes in the position of each object with time, the sensing time is important. The sensing time added by another information processing device is used on precondition that the time precision is assured. Consequently, in the case where the time precision is not assured, the function of notifying another information processing device of the fact is necessary.

The information of the position and orientation on the map of the vehicle obtained by the vehicle position detecting unit B 301, time at which they are obtained, the result recognized by the recognition processing unit B 341, time at which sensing information used for the recognition is obtained, and a feature point detected by the reference feature point extraction processing unit B 311 is transmitted to another information processing device (that is, the information processing device (type EA) 100A) via the communication processing unit B 351.

The result recognized by the recognition processing unit B 341 includes the kind of the recognized object (in the case where the kind is unknown, the kind may be "unknown") and position information of the object. Preferably, the position information includes a relative position using the outside sensor B 321 as a reference. However, if information necessary to calculate the relative position is included in the information transmitted from the communication processing unit B 351, the position information may be a relative position on the coordinates managed by the environmental map of the information processing device (type FA) 300A or a position using longitude and latitude. For example, when the reference point of a vehicle in which the information processing device (type FA) 300A is mounted is set as the origin and, in case of position information in a coordinate system adapted to the orientation of the vehicle, the information of the position and the orientation of the outside sensor B 321 in the coordinate system is used, and a relative position using the outside sensor B 321 as a reference can be calculated. In the case where the position information is longitude and latitude, there is information of the position and the orientation as a reference used to calculate the longitude and the latitude (for example, information obtained by the vehicle position detecting unit B 301 and the information of the vehicle installation position and the orientation of the outside sensor B 321). Consequently, from those pieces of information, the relative position using the outside sensor B 321 as a reference can be calculated.

The recognition processing unit B 341 has, to use the recognition result in the vehicle in which the information processing device (type FA) 300A is mounted, an outside recognition output B 391 as an output (value). By using the outside recognition output B 391, the vehicle in which the information processing device (type FA) 300A is mounted can use a process result of the recognition processing unit B 341 for, for example, a control of an advanced drive assisting function.

The information processing device (type EA) 100A has a time managing unit A 131 managing time of the entire device, a vehicle position detecting unit A 101 having the functions corresponding to a navigation system in which a GPS and the like are mounted and obtaining the position and the orientation on a map of the vehicle in which the device is mounted, an outside sensor connecting unit A 122 obtaining sensing information by an outside sensor A 121 sensing the situation of the outside by communication, a recognition processing unit A 141 detecting an object and an indication such as a figure and characters existing on the outside from the sensing information obtained by the outside sensor A 121 via the outside sensor connecting unit A 122 and recognizing relative position and orientation using the outside sensor A 121 as a reference, a reference feature point extraction processing unit A 111 extracting reference feature points which can be configuration information of an environmental map of a circumferential area and can be used as position references on the map from the result of recognition of the recognition processing unit A 141, and a communication processing unit A 151 performing communication with the information processing device (type FA) 300A mounted in a different vehicle.

The time managing unit A 131 has a function of suppressing an error within one millisecond by, for example, obtaining synchronization with time information of the GPS every one hour at maximum and, if precision cannot be assured for a reason such that the time information of the GPS cannot be obtained for long time and synchronization cannot be obtained, notifying the fact to components of the information processing device (type EA) 100A. In the case of using the GPS, the time managing unit A 131 may share the GPS signal receiving function with the vehicle position detecting unit A 101.

As the outside sensor A 121, although use of a camera, a laser range finder, a millimeter-wave radar, an ultrasonic sensor (sonar), or the like is assumed, another sensor may be used as long as it can sense the situation of the outside. At the time of outputting sensing information, the outside sensor A 121 adds time (sensing time) at which sensing is executed.

The information processing device (type EA) 100A further includes, to use information obtained from the information processing device (type FA) 300A by using the communication processing unit A 151, a reference feature point matching processing unit 161, a position correction processing unit A 171, and a recognition result integration processing unit 181.

The reference feature point matching processing unit 161 makes association (matching process) between a reference feature point extracted by the reference feature point extraction processing unit A 111 and a reference feature point extracted by the reference feature point extraction processing unit B 311 obtained via the communication processing unit B 351 in consideration of the position and the orientation obtained by the vehicle position detecting unit A 101 and the position and the orientation obtained by the vehicle position detecting unit B 301 via the communication processing unit A 151.

In the association (matching process), first, the same objects or indications existing in almost the same position are matched, and feature points of the objects or indications are matched in consideration of the positional relation between the feature points and the orientations of the outside sensors of the information processing devices.

With respect to the matched feature point, using the position and orientation information of the feature point obtained by the recognition processing unit A 141 and obtained as a reference feature point by extraction of the reference feature point extraction processing unit A 111 and the position and orientation of the vehicle obtained by the vehicle position detecting unit A 101, the position on the environmental map of the circumferential area is calculated. The position is passed as the position on the environment map of the circumferential area of the reference feature point recognized by the information processing device (type EA) 100A to the position correction processing unit A 171.

The position information of the reference feature point obtained from the information processing device (type FA) 300A via the communication processing unit A 151 is also passed as position information of the reference feature point recognized by the information processing device (type FA) 300A to the position correction processing unit A 171. Preferably, the position information from the information processing device (type FA) 300A includes information of a relative position using the outside sensor B 321 as a reference.

The position correction processing unit A 171 corrects position information of a reference feature point recognized on the side of the information processing device (type FA) 300A obtained via the communication processing unit A 151 and a recognized object other than the reference feature point (in other words, an object or indication existing on the outside detected by the outside sensor B 321). For this correction, a position recognized as the information processing device (type EA) 100A obtained from the reference feature point matching processing unit 161 and a position recognized as the information processing device (type FA) 300A relative to the same reference feature point are used (the details will be described later). The corrected position information is sent together with information of the recognition object corresponding to the position to the recognition result integration processing unit 181.

In the case where information which can determine stop of the vehicle in which the information processing device (type FA) 300A is mounted, for example, vehicle velocity information or the like can be obtained from the information processing device (type FA) 300A, after time in which vibrations of the vehicle are considered to be diminished after stop of the vehicle lapses and a situation that the outside sensor B 321 is regarded to be stationary, the position on the environmental map is calculated once with respect to a reference feature point obtained from the information processing device (type FA) 300A. After that, until the outside sensor B 321 starts moving in association with the start of motion of the vehicle (specifically, until start of the motion of the outside sensor B 321 is recognized), association (matching process) of reference feature points is fixed and the association (matching process) of the reference feature points in the reference feature point matching processing unit 161 is omitted (stopped), thereby reducing the process load of the reference feature point matching processing unit 161. Alternately, without completely omitting the association of the reference feature points in the reference feature point matching processing unit 161, it can be considered to make the frequency (process interval) of performing the association longer than the normal case.

The recognition result integration processing unit 181 integrates a recognition object recognized by the recognition processing unit A 141 and a recognition object on the side of the information processing device (type FA) 300A obtained from the position correction processing unit A 171 and outputs the resultant as an outside recognition output A 191. Since the relative position of the recognition object recognized by the outside sensor A 121 is converted to a position on the map by the recognition processing unit A 141, the recognition result integration processing unit 181 also uses an output of the vehicle position detecting unit A 101.

The recognition result integration processing unit 181 reflects the position of the vehicle in which the information processing device (type FA) 300A is mounted into the environmental map by using the position and the orientation on the map of the vehicle obtained by the vehicle position detecting unit B 301 via the communication processing unit A 151. In a possible case, the recognition result integration processing unit 181 also reflects the position of the vehicle in which the information processing device (type FA) 300A is mounted into the environmental map by using the position information corrected by the position correcting unit A 171. For example, in the case where the relation between the position and the orientation of the points indicating the outside sensor B 321 and the vehicle position is provided from the information processing device (type FA) 300A and the position of the reference feature point is a relative position from the outside sensor B 321, the position of the vehicle in which the information processing device (type FA) 300A corrected to the coordinates of the environmental map managed by the recognition result integration processing unit 181 is mounted is obtained by calculation.

In the recognition result integration processing unit 181, at the time of generating the environmental map by integrating various position information, correction of a positional deviation caused due to variations of sensing time is also performed. For this process, in the recognition result integration processing unit 181, at the time of generating an environmental map, reference time is determined, interpolation or extrapolation is performed on the basis of a change in a time sequence of position information of each object, and each object is disposed in an estimated position at the reference time.

To facilitate correction of a positional deviation which occurs due to variations of time in the recognition result integration processing unit 181, it is also considered to obtain the velocity vector of the object detected by the outside sensor A 121, the outside sensor B 321, the recognition processing unit A 141, or the recognition processing unit B 341 and transfer also the information to the recognition result integration processing unit 181. By performing the position correction on the basis of the velocity vector, information which can be used to estimate a position change with time of the detected object increases, and improvement of position estimation precision at the time as a reference can be expected. Further, when the position estimation precision accompanying the time change improves, it can be also considered to use the precision improvement amount to suppress the frequency of receiving the information from the information processing device (type FA) 300A.

After reflecting an object which can be determined as a stationary one from the velocity vector once into the environmental map, by eliminating the object from the position calculation process until the motion is detected again or a predetermined period elapses, the computation process load of the position correction processing unit A 171 or the recognition result integration processing unit 181 can be reduced.

The outside recognition output A 191 as an output of the recognition result integration processing unit 181 includes the position and kind of each object, a time-sequential change, and a velocity vector included in input information on the basis of the generated environmental map and can be used, for example, for determination and control necessary for an advanced drive assistance function and an automatic driving function.

To the communication processing unit A 151, a determination information input A 195 as an input of a result of a determining process as a part of an advanced drive assisting function and an automatic drive function is supplied. For example, in the case where a hard braking is made as a result of the determining process, this input is used for transmitting execution of the hard braking together with the position and identification information (such as car registration plate information) of the vehicle in which the information processing device (type EA) 100A is mounted to an information processing device of a vehicle existing in the surrounding from the communication processing unit A 151. The information processing device of the vehicle which received the information determines whether the information is from a vehicle travelling ahead or not on the basis of the relative position and the identification information and, if the information is from the vehicle ahead, by demanding the determining function as a component of the advanced drive assisting function and the automatic drive function to start braking, the risk of collision to the vehicle ahead can be suppressed.

The feature points extracted as reference feature points by the reference feature point extraction processing unit B 311 of the information processing device (type FA) 300A and the reference feature point extraction processing unit A 111 of the information processing device (type EA) 100A are corners of various markers (stop line, sign indicating intersection, traffic lane, and the like) on the roads, a part closest to the ground of a specific sign plate, the center of a pole at the root of the pole on which a sign is mounted, and the like. Other things may be also employed as long as they are points as references to specify the positions on a map.

Figure 4:
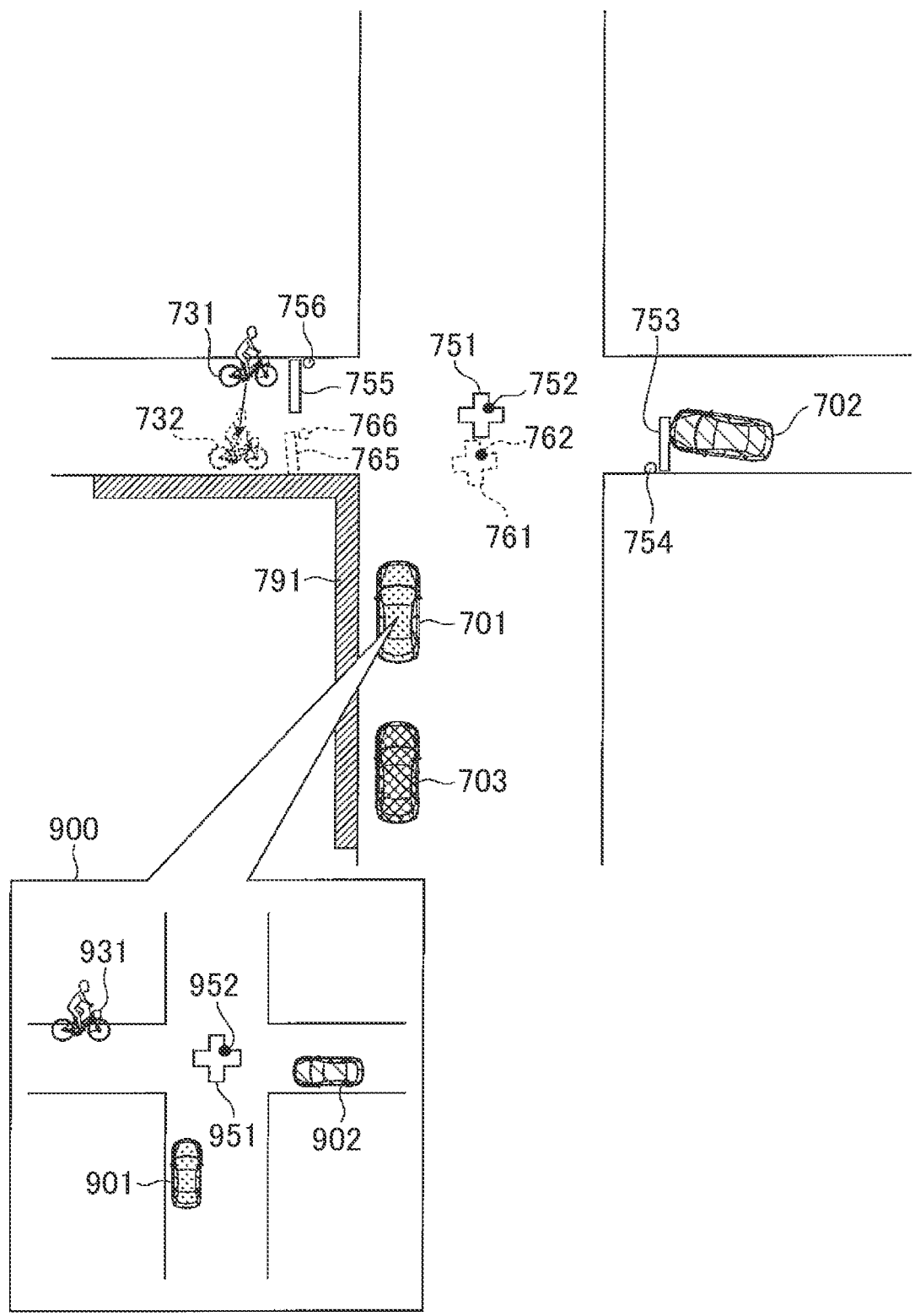
FIG. 4 illustrates an example of an intersection in which an intersection mark exists.
Figure 5:
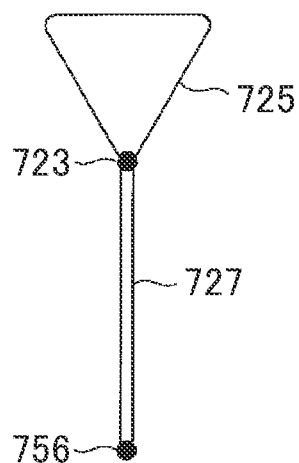
FIG. 5 illustrates an example of a sign installed at an intersection.
Figure 6:
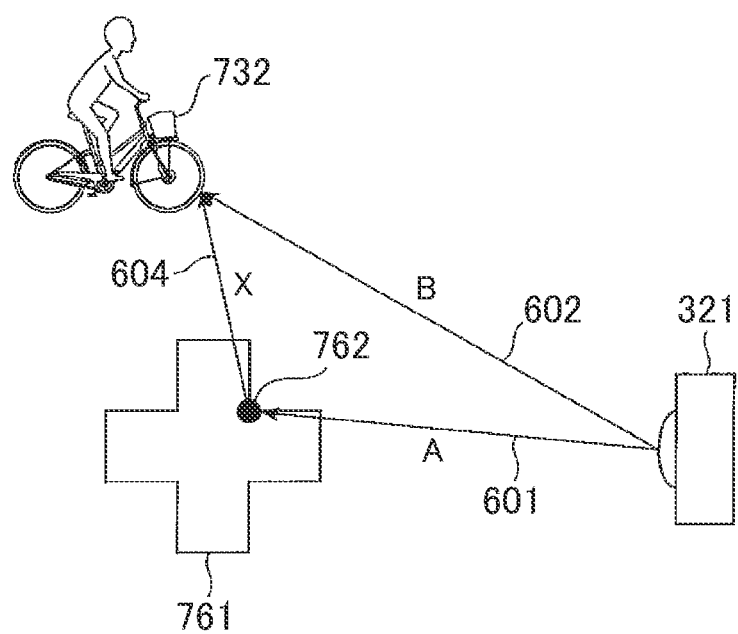
FIG. 6 is an explanatory diagram of a position correction processing method for an object detected by an information processing device mounted in another vehicle.

With reference to FIGS. 4 to 6, how to correct position information of an object or the like obtained from the information processing device (type FA) 300A by (the position correction processing unit A 171) of the information processing device (type EA) 100A will be described.

FIG. 4 illustrates a situation of an intersection with poor visibility in which a wall 791 exists. At the intersection, there are an intersection mark 751, a first stop line 753, and a second stop line 755. Signs are also mounted, and a root 754 of a first supporting pillar to which a first sign is mounted and a root 756 of a second supporting pillar to which a second sign is mounted are illustrated. Further, as a reference feature point for explanation, an intersection mark feature point 752 as a feature point of the intersection mark 751 is illustrated.

FIG. 5 illustrates an example of the second sign mounted at the intersection. A sign plate 725 is attached to a supporting pillar 727, and there are the root 756 of the second supporting pillar 727 and a part 723 closest to the ground of the sign plate 725 (in this case, the part attached to the supporting pillar 727) as reference feature points. It is assumed here that the sign is a sign of "stop" but another sign may be also used. There is a case that it is difficult to specify the part 723 closest to the ground of the sign plate 725 depending on the shape of the sign plate 725, and there may be a case that the supporting pillar 727 is bent due to an accident or the like. Consequently, as the reference feature point, the root 756 of the second supporting pillar 727 is more preferable than the part 723 closest to the ground of the sign plate 725.

To the intersection illustrated in FIG. 4, the first vehicle 701 in which the information processing device (type EA) 100A is mounted, the second vehicle 702 in which the information processing device (type FA) 300A is mounted, and a bicycle 731 are approaching. Further, a third vehicle 703 is travelling behind the first vehicle 701.

It is assumed that the precision of the vehicle position detecting unit B 301 of the information processing device (type FA) 300A is low and there is an error in the orientation of the second vehicle 702. Due to the influence of the error, the information processing device (type FA) 300A recognizes the intersection mark 751 as an intersection mark 761 which is position deviated, the intersection mark feature point 752 as an intersection mark feature point 762 which is position deviated, the second stop line 755 as a second stop line 765 which is position deviated, the root 756 of the second supporting pillar as a root 766 of a second supporting pillar which is position deviated, and the bicycle 731 as a bicycle 732 which is position deviated. That is, the information processing device (type FA) 300A transmits information corresponding to a recognition result which is influenced by the error from the communication processing unit B 351 to the information processing devices of the vehicles existing in the circumferential area.

An environmental map 900 of the circumferential area recognized by the information processing device (type EA) 100A includes a first vehicle 901 on the environmental map based on vehicle self-position information detected by the vehicle position detecting unit A 101, a second vehicle 902 on the environmental map based on the position information provided by the information processing device (type FA) 300A, and an intersection mark 951 on the environmental map and an intersection mark feature point 952 on the environmental map obtained by the recognizing process and the vehicle position detecting process of the information processing device (type EA) 100A. In addition, a bicycle 931 on the environmental map based on position information which is subjected to position correction by the position correction processing unit A 171 exists. In reality, those positions are results of correcting the positional deviations caused by time differences in the recognition result integration processing unit 181.

FIG. 6 illustrates a method of the position correcting process. To make the explanation easier, changes in positions caused by time differences are ignored. That is, a state at the same time will be described on assumption that a process of correcting the influence of time lapse is performed on each of values as necessary.

A vector A 601 indicates a relative position to an intersection mark feature point 762 which is position deviated from the outside sensor B 321, and a vector B 602 indicates a relative position to the bicycle 732 which is position deviated from the outside sensor B 321. That is, the vector A 601 and the vector B 602 correspond to position vectors in a three-dimensional orthogonal coordinate system which is fixed in a certain direction using the outside sensor B 321 as the origin and the orientation of the outside sensor B 321 as a reference.

By subtracting the vector A 601 from the vector B 602, a vector X 604 indicating the relative position to the bicycle 732 which is position deviated from the deviated intersection mark feature point 762 can be obtained.

Since the vector X 604 does not depend on the position and the orientation of the outside sensor B 321, it can be regarded as the same vector value indicating the relative position to the bicycle 732 from the intersection mark feature point 752 (which is not position-deviated). Consequently, by adding the vector X 604 to the position of the intersection mark feature point 952 on the environmental map, the position using the intersection mark feature point 952 on the environmental map as a reference point can be calculated. The vector X 604 is added after performing proper conversion so as to be adapted to the coordinate system of the environmental map.

By using the calculated position as a position correction result by the position correcting unit A 171, the position of the bicycle 931 on the environmental map can be determined. In the process, the positions of the vector A 601 and the intersection mark feature point 952 on the environmental map become correction parameters to correct the position of the position-deviated bicycle 732 indicated by the vector B 602.

Since the vector X 604 is a vector indicating the relative position to the bicycle 732 which is position deviated from the position-deviated intersection mark feature point 762, the position of the bicycle 732 which is position deviated may be calculated by using the position recognized as the information processing device (type FA) 300A in place of the vector A 601 and the vector B 602. However, when the difference is calculated on the basis of the relative position information output from the outside sensor B 321, that is, the relative position information from the outside sensor which is output from the same outside sensor like the vector A 601 and the vector B 602, there is an advantage that the influence of an installation shift in the vehicle of the outside sensor, the influence of vibration of the vehicle, and the like can be cancelled off. In the case of calculation using the vector A 601 and the vector B 602, the calculation does not depend on the position of the vehicle 702 in which the information processing device (type FA) 300A is mounted, so that the position information of the vehicle 702 is also unnecessary.

Although the correction of the position of the (position-deviated) bicycle 732 existing in a position which comes in a blind spot from the first vehicle 701 in which the information processing device (type EA) 100A is mounted due to the existence of the wall 791 by using the position-deviated intersection mark feature point 762 and the like has been described as an example, obviously, the other recognition objects (the intersection mark 761, the intersection mark feature point 762, the second stop line 765, and the root 766 of the second supporting pillar) can be similarly corrected.

Although the third vehicle 703 traveling behind the first vehicle 701 is not reflected in the environmental map 900, in the case where the third vehicle 703 has the function of notifying another vehicle of the self-position or an outside sensor for monitoring the rearward exists in the first vehicle 701, the existence of the third vehicle 703 can be reflected in the environmental map 900 from the information.

In the case where the first vehicle 701 determines to activate an emergency brake on the basis of the environmental map 900, the information is transmitted (together with the determination information input A 195) from the communication processing unit A 151. When the third vehicle 703 can receive the information and it is determined that the information is from the vehicle 701 ahead of the third vehicle 703, the third vehicle 703 starts deceleration and can prepare for a hard braking of the first vehicle 701.

FIG. 7 illustrates an example of reference feature points transmitted from the information processing device (type FA) 300A and position information of detected objects.

In FIG. 7, position information number 11 is a serial number in a series of reference feature points and position information of a detected object transmitted from the information processing device (type FA) 300A and the numbers are assigned in sequence from 1 in transmission order.

Sensor ID 12 is an identification number of an outside sensor used for detecting the position. Since an outside sensor in the information processing device (type FA) 300A is the outside sensor B 321 only, all of the sensor IDs 12 in FIG. 7 is 1. However, when an information processing device has a plurality of outside sensors, a unique number is assigned to each outside sensor so that the outside sensors which detect position information can be discriminated from one another by the sensor IDs 12. As described above, since it is necessary to discriminate an outside sensor to perform a process in a coordinate system using the position of the outside sensor as a reference, the sensor ID 12 is necessary.

A longitude offset 13 and a latitude offset 14 indicate relative positions of a reference feature point and a detected object to the outside sensor using the longitude and latitude axes as references. In a place other than a place of high latitude, it can be regarded that the longitude and latitude cross at right angles in a relatively close region, so that the axes of longitude and latitude can be used. In the case of indicating the position of a wide object, for example, the position corresponding to the center of the width of the object is indicated.

An altitude offset 15 indicates height of a reference feature point and a detected object using the position of the road surface as a reference. In the case where the height of a tall object is indicated, for example, the height of the center of the object is indicated.

Object ID 16 has, together with information indicating a reference feature point or another detected object, information of an identification number assigned for a lump of indications (such as a figure) or on the object unit basis and identification number assigned every feature point belonging to a lump of indications (such as a figure) and an object. As a concrete example, as illustrated by the intersection mark 761 in the bottom of FIG. 7, to the intersection mark 761 in which an identification number ("reference 1" obtained by adding serial number "1" to "reference" indicating a reference feature point) is assigned to an indication or object having a reference feature point, identification numbers (ID1 to ID4) of feature points in the indication or object are assigned. As the object ID 16, a combination of an identification number of an indication or object and an identification number of each feature point is displayed.

Kind 17 indicates kind information determined by the indication or object recognized by the recognition processing unit B 341. Since the kind information is useful for behavior prediction in the case of performing determination in advanced drive assist or automatic driving, it is included in transmission information. When the recognition processing unit B 341 cannot determine the kind but detects the presence of any indication or object, the kind may be "unknown". However, even in the case of "unknown", when it can be discriminated that the object is a stationary object or a moving object, moving/stationary determination information may be added like "unknown stationary object" and "unknown moving object".

Width 18 and height 19 are information indicating width and height of an indication and an object detected. In the case of a feature point including a reference feature point, it indicates "point", so that each of width and height becomes zero. The width 18 and the height 19 correspond to the width 18 and the height 19 of a rectangle shape surrounding an object from the viewpoint of an outside sensor detecting the object, for example, like the bicycle 732 illustrated in FIG. 8.

Reliability 20 indicates reliability of each reference feature point, the existence of a detected object, and position information. Since it is difficult to perform the recognizing process always accurately, the reliability is lowered until the recognition result becomes stable.

The reliability is lowered also in the case such that the position of a feature point may be influenced by blur of a part of an indication such as a figure or deformation of the supporting pillar 727 of a sign. The information processing device (type EA) 100A preferentially uses information with high reliability among received information. The information processing device (type EA) 100A refers to, as a reference feature point, only a reference feature point corresponding to a reference feature point with high reliability which can be extracted also by the reference feature point extraction processing unit A 111.

In the case where a plurality of reference feature points with high reliability can be used, position correction of a detected object is performed by using a representative one point or a plurality of points. In the case of using a plurality of reference feature points, a correction position is calculated by using each of the reference feature points, and an average position of the calculated ones is obtained and used. The maximum number of reference feature points used may be limited without using all of the reference feature points in consideration of the processing load of the information processing device (type EA) 100A.

Figure 8:
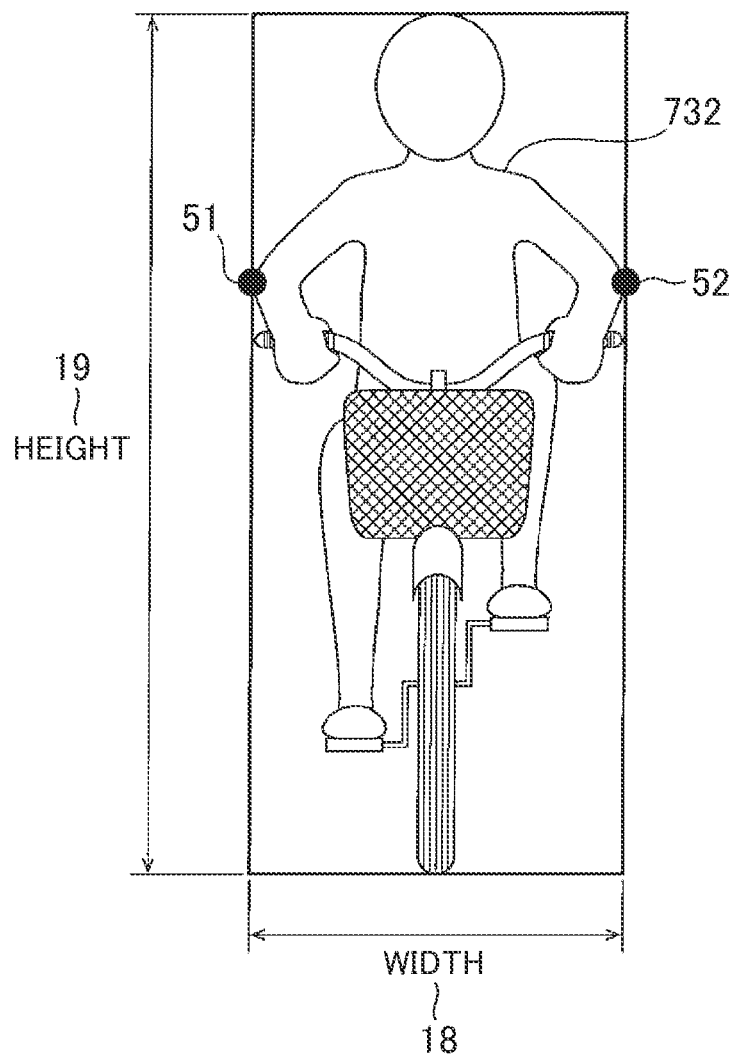
FIG. 8 illustrates an example of a bicycle recognized by the information processing device (type FA).

With respect to the position of a detected object, in a possible case, information of feature points corresponding to both ends of width like a third feature point 51 and a fourth feature point 52 illustrated in FIG. 8 is also included in information which is transmitted. The information corresponds to position information that the position information number 11 in FIG. 7 is "6" and "7". Since the width 18 and the height 19 become values at the viewpoint of the outside sensor B 321, there is a case that it is difficult to use them depending on the orientation of the vehicle in which the information processing device (type EA) 100A is mounted. When the position information is "point", as described by referring to FIG. 6, it can be used by correcting the position in three-dimensional space. Consequently, by transmitting position information of feature points corresponding to both ends of the width in addition to the coordinates of the center point of the width 18 and the height 19, the reception side can make handling such as determination using the position of a feature point closest to itself, and use of the position information becomes easier.

Addition of a velocity vector to the information of a detected object can be also considered. In this case, for example, when the velocity vector is a velocity vector relative to the outside sensor B 321, it can be handled as a value indicating a change with time of the vector B 602 in the information processing device (type EA) 100A and can be used for position correction accompanying time variation in the recognition result integration processing unit 181.

In the embodiment, for convenience, it is described on the precondition that the first outside sensing information processing device 100A and the second outside sensing information processing device 300A are basically mounted in vehicles. However, they may be mounted in moving objects different from vehicles or the second outside sensing information processing device may be mounted in a stationary object installed on a road or the like. In the case of mounting the devices in a moving object different from a vehicle or a stationary object, the "vehicle" may be considered as the "object".

Figure 9:
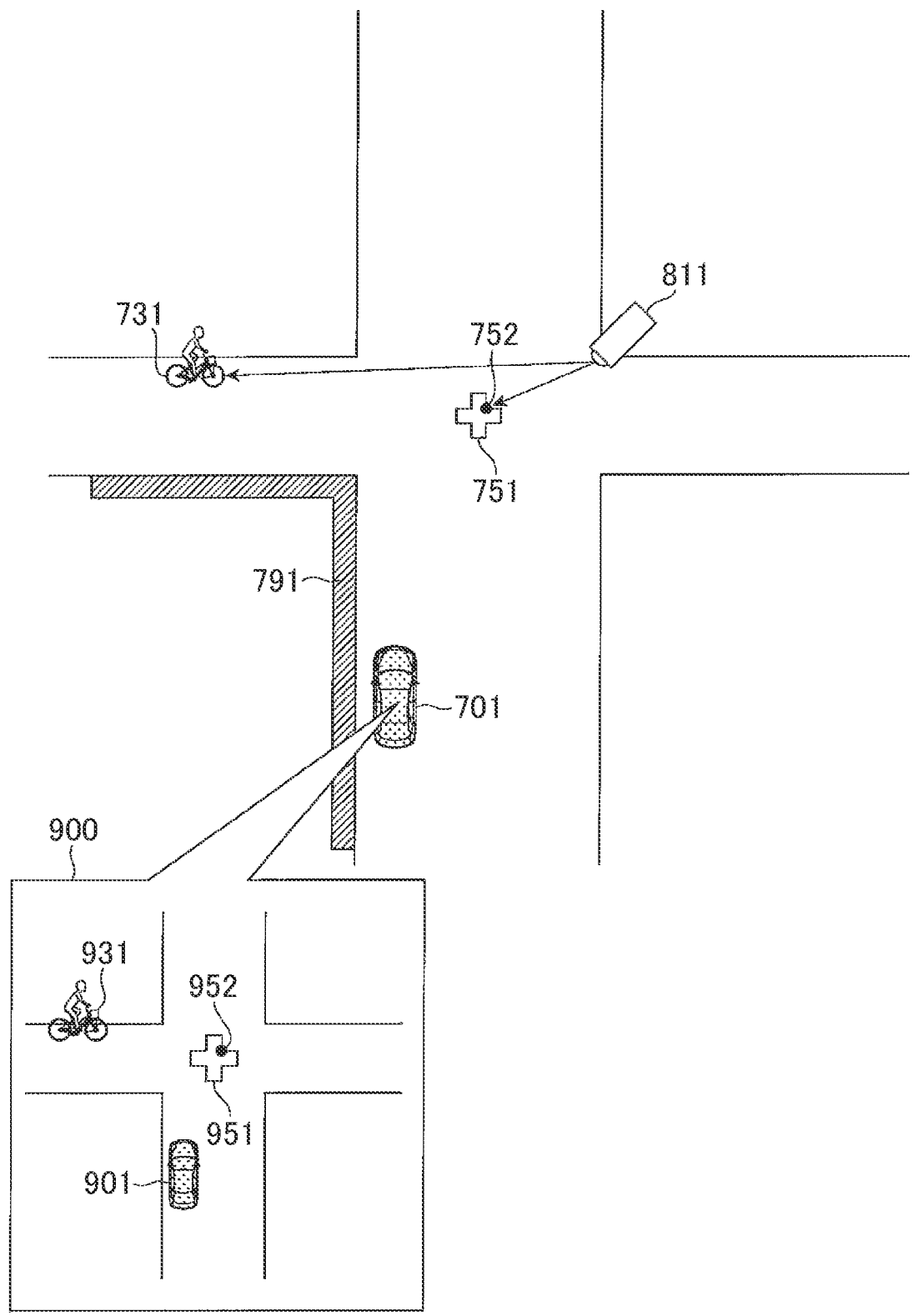
FIG. 9 illustrates an example of an intersection in which an intersection monitoring camera is installed.

For example, as illustrated in FIG. 9, there may be a case that an intersection monitoring camera 811 as an outside sensor is installed at an intersection, and the intersection monitoring camera 811 has the function corresponding to the information processing device (type FA) 300A. In this configuration, the vehicle position detecting unit B 301 may provide information of the installation position and the orientation of the intersection monitoring camera 811 which is preliminarily registered. Even the intersection monitoring camera 811 as a stationary object, the position and the orientation may be changed without intension due to typhoon, earthquake, or the like. However, by using the configuration as illustrated in FIG. 3, the first vehicle 701 can be free of the influence of such a change.

As the process of the information processing device (type EA) 100A in this case, a process similar to that in the case where the vehicle in which the information processing device (type FA) 300A is mounted stops can be performed. Specifically, once the position on the environmental map is calculated with respect to a reference feature point obtained from the information processing device (type FA) 300A, by fixing the position on the environmental map and omitting (stopping) association (matching process) of the reference feature point in the reference feature point matching processing unit 161, the process load of the reference feature point matching processing unit 161 can be reduced.

Another configuration may be employed such that the processing units constructing the inner part illustrated as the information processing device in the embodiment may be mounted as different devices, and the devices are connected to one another. Further, the information processing device (type EA) 100A may communicate with a plurality of information processing devices (type FA) 300A at the same time, integrate information, and output the resultant as the outside recognition output A 191.

In the case of performing communication with a plurality of information processing devices (type FA) 300A (in other words, in the case of receiving sensing information by a plurality of outside sensors B 321), on each of roads gathered at an intersection to which the first vehicle 701 in which the information processing device (type EA) 100A is mounted is approaching, the first vehicle 701 faces towards the intersection, and the information processing device (type EA) 100A uses information (sensing information) from (the outside sensor mounted in) a vehicle closest to the intersection preferentially for a matching process or the like. Information (sensing information) from (the outside sensor mounted in) a vehicle whose orientation is close to a direction which is orthogonal to the orientation of the first vehicle 701 is preferentially used for a matching process or the like.

By using the information (sensing information) at such priority, even in the case where information from all of the information processing devices (type FA) 300A cannot be processed in computation load and a communication destination has to be limited, the possibility that position information of an object with high importance is obtained increases for the following reasons. The possibility that, on each of roads gathered at an intersection, there is an obstacle in front of a vehicle closest to the intersection is low, and a blind area by an obstacle occurs more easily, as compared with a road on which the first vehicle 701 travels, on a road crossing the road.

In the information processing device (type EA) 100A, the recognition processing unit A 141, the reference feature point extraction processing unit A 111, and the vehicle position detecting unit A 101 are connected to the communication processing unit 151 and the function of notifying a situation of assurance of time precision of the time managing unit A 131 from the communication processing unit 151 to another information processing device is added. In such a manner, the function of the information processing device (type FA) 300A can be added to the information processing device (type EA) 100A. Between vehicles in each of which an information processing device having such a configuration is mounted, a reference feature point and position information of an object or an indication can be transmitted to both of them, and each of the vehicles can correct the position information of the object or indication of the other vehicle and use the resultant information.

As described above, the information processing device (type EA) 100A of the first embodiment has: the receiving function (the communication processing unit A 151) of receiving configuration information (reference feature points) of an environmental map as a reference of position, which is extracted from sensing information of the outside sensor B 321 mounted in a second moving object or a stationary object (the second vehicle 702 or the intersection monitoring camera 811); the matching function (the reference feature point matching processing unit 161) of matching configuration information (reference feature point) of the environmental map obtained by the receiving function to configuration information (reference feature point) of an environmental map obtained by a function of the information processing device (type EA) 100A (in the embodiment, the outside sensor A 121, the reference feature point extraction processing unit A 111, or the like mounted in a first moving object (the first vehicle 701); and a correction function (the position correction processing unit A 171) of correcting position information of an object or an indication existing on the outside of the first moving object (the first vehicle 701) detected (sensed) by the external sensor B 321 mounted in the second moving object or a stationary object (the second vehicle 702 or the intersection monitoring camera 811) by using the matching result of the matching function.

According to the first embodiment, for example, at the time of transmitting position information of an object or an indication detected by the outside sensor mounted in (the information processing device (type FA) 300A) of another vehicle (or an outside sensor of a camera mounted on a road), the position of a feature point of the object (stationary object) and the indication as configuration information of an environmental map as a reference of positions is also detected and transmitted. When (the information processing device (type EA) 100A) of the present vehicle receives those pieces of information, the position of the object or indication on the environmental map of the present vehicle is calculated (corrected) on the basis of a relative position relation of the position information of an object or indication as a target and the position of the feature point (reference feature point) and the position of the feature point (reference feature point) grasped by the present vehicle.

As described above, in the first embodiment, the position of an object or indication detected by the outside sensor B 321 mounted in another vehicle is calculated on the basis of a feature point detected by the outside sensor B 321 mounted in another vehicle. Consequently, even in a situation that the present vehicle cannot detect another vehicle or the like, the vehicle can use a detection result of the outside sensor B 321 mounted in the another vehicle. Moreover, since the position of an object or indication detected by the outside sensor B 321 mounted in another vehicle is calculated using the position of a feature point (reference feature point) grasped by the present vehicle as a reference, the position precision at the time of reflecting the position of the object or indication detected by the outside sensor B 321 mounted in another vehicle into the map of the present vehicle improves.

Second Embodiment

Figure 10:
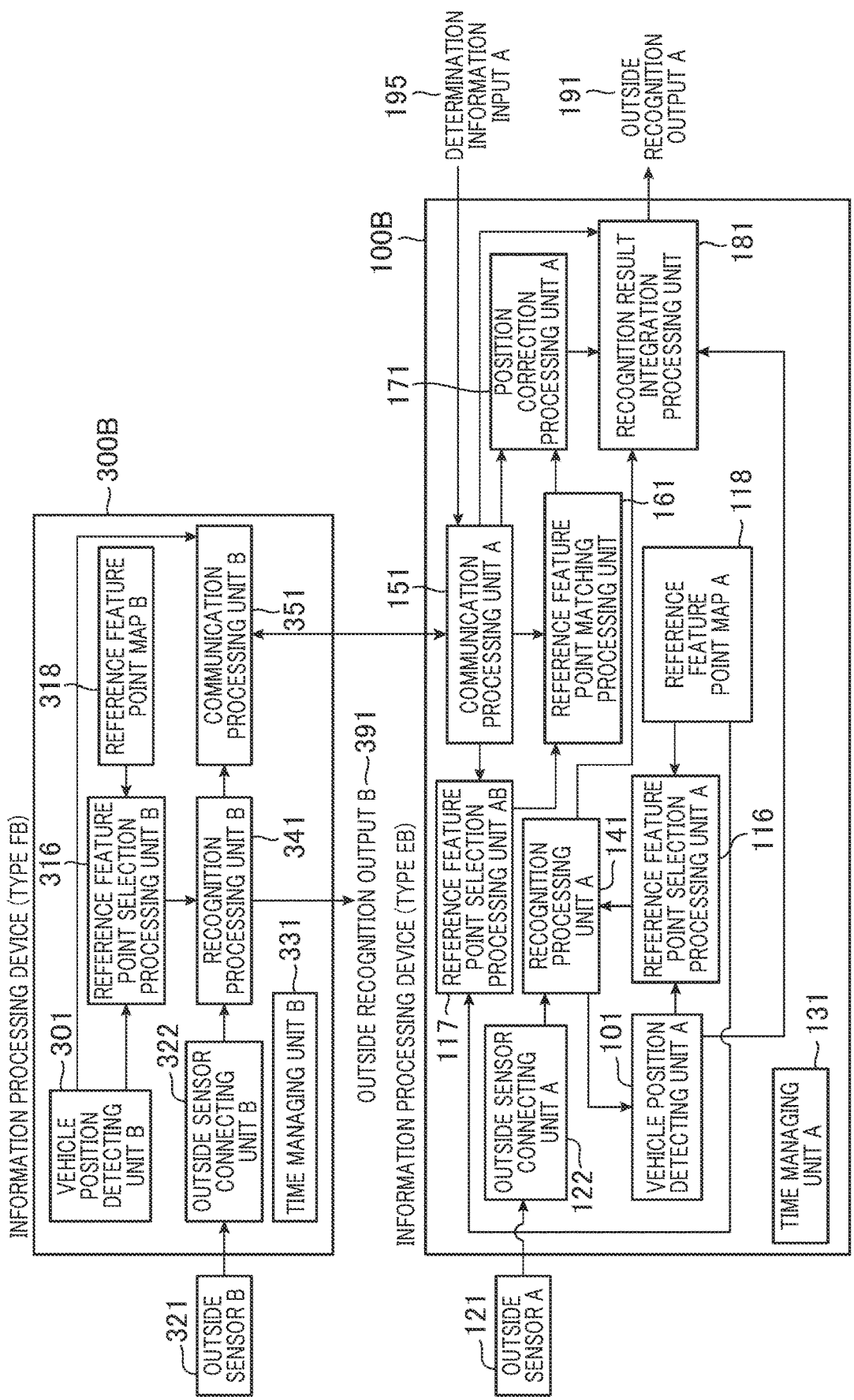
FIG. 10 illustrates a functional block configuration example of an information processing device (type FB) and an information processing device (type EB) of a second embodiment.

A configuration example of function blocks of a second embodiment of the present invention will be described with reference to FIG. 10. The hardware configuration itself is almost the same as that described with reference to FIG. 2 in the first embodiment. The same reference numerals are designated to parts having the same functions as those in the first embodiment, repetitive description will not be given and, hereinafter, the different points will be mainly described.

First, an information processing device (type FB) 300B will be described. The information processing device (type FB) 300B of the second embodiment is obtained by adding a reference feature point map B 318 to the configuration of the information processing device (type FA) 300A of the first embodiment, and changing the reference feature point extraction processing unit B 311 to a reference feature point selection processing unit B 316.

The reference feature point map B 318 is configuration information of an environmental map of the circumferential area and is detailed map information (map data) having identification ID, place, and kind of a reference feature point which can be used as a position reference on the map. In the embodiment in which the reference feature point map B 318 exists, the reference feature point selection processing unit B 316 makes determination from the information of the position and orientation of a vehicle obtained from the vehicle position detecting unit B 301, selects a candidate reference feature point from the reference feature point map B 318, and provides it to the recognition processing unit B 341.

At the time of performing a process of recognizing sensing information obtained by the outside sensor B 321 via the outside sensor connecting unit B 322, the recognition processing unit B 341 recognizes a reference feature point on the basis of information provided from the reference feature point selection processing unit B 316. At the time of performing the recognizing process, the recognition processing unit B 341 can know an area to be recognized to detect a reference feature point from the provided information. Consequently, the efficiency of the process of recognizing a reference feature point improves.

The position and the orientation on a map of a vehicle obtained by the vehicle position detecting unit B 301, time at which they are obtained, a result of recognition of an object and a reference feature point recognized by the recognition processing unit B 341, and time at which sensing information used for recognition is obtained are transmitted to an information processing device (type EB) 100B via the communication processing unit B 351.

The function of the time managing unit B 331 is the same as that of the first embodiment.

Next, the configuration of the information processing device (type EB) 100B will be described. The information processing device (type EB) 100B of the second embodiment is obtained by, with respect to the configuration of the information processing device (type EA) 100A of the first embodiment, adding a reference feature point map A 118, changing the reference feature point extraction processing unit A 111 to a reference feature point selection processing unit A 116, and adding a reference feature point selection processing unit AB 117.

The reference feature point map A 118 is configuration information of an environmental map of the circumferential area and detailed map information (map data) having information of identification ID of a reference feature point, location, and kind which can be used as a position reference on the map. In the second embodiment in which the reference feature point map A 118 exists, the reference feature point selection processing unit A 116 makes determination from the information of the position and orientation of a vehicle obtained from the vehicle position detecting unit A 101, selects a candidate reference feature point from the reference feature point map A 118, and provides it to the recognition processing unit A 141. The reference feature point selection processing unit AB 117 makes determination from the information of the position and the orientation of a vehicle obtained from the vehicle position detecting unit B 301 transmitted from the information processing device (type FB) 300B, selects a candidate reference feature point from the reference feature point map A 118, and provides it to the reference feature point matching processing unit 161.

At the time of performing a process of recognizing sensing information obtained by the outside sensor A 121 via the outside sensor connecting unit A 122, the recognition processing unit A 141 recognizes a reference feature point on the basis of information provided from the reference feature point selection processing unit A 116. At the time of performing the recognizing process, the recognition processing unit A 141 can know an area to be recognized to detect a reference feature point from the provided information. Consequently, the efficiency of the process of recognizing a reference feature point improves.

The recognition processing unit A 141 feeds back a result of recognizing a reference feature point to the vehicle position detecting unit A 101. By the feedback, correction can be made so that the position of a recognized reference feature point becomes a position corresponding to the reference feature point map A 118, so that a vehicle and a recognition result of the recognition processing unit A 141 can be reflected in positions using the reference feature point map A 118 as a reference.

The reference feature point matching processing unit 161 performs association (matching process) between a reference feature point recognized on the information processing device (type FB) 300B side and a reference feature point as a candidate provided by the reference feature point selection processing unit AB 117. The reference feature point matching processing unit 161 transmits the matched reference feature point together with the position information of the reference feature point recognized on the side of the information processing device (type FB) 300B while adding the information position in the reference feature point map A 118 to the position correction processing unit A 171.

The position correction processing unit A 171 corrects the position of a detected object or indication and a feature point in a manner similar to the method described with reference to FIG. 6 in the first embodiment. A result of subtracting the vector A 601 from the vector B 602 (refer to FIG. 6) becomes the position in the reference feature point map A 118 of the reference feature point used for correction. Different from the first embodiment, for correction of the position information of the object or indication recognized by the information processing device (type FB) 300B side, the result of recognition of the reference feature point of the recognition processing unit A 141 is unnecessary. That is, the information processing device (type FB) 300B and the information processing device (type EB) 100B do not have to recognize the same reference feature point.

When the same identification ID is assigned to the same reference feature point in the reference feature point map A 118 and the reference feature point map B 318, the reference feature point matching processing unit 161 can make the matching only by the identification ID, and the matching process of the reference feature point becomes easier.

The function of each of the time managing unit A 131 and the recognition result integration processing unit 181 is the same as that of the first embodiment.

Using FIG. 11, the case effective to the second embodiment will be described.

Figure 11:
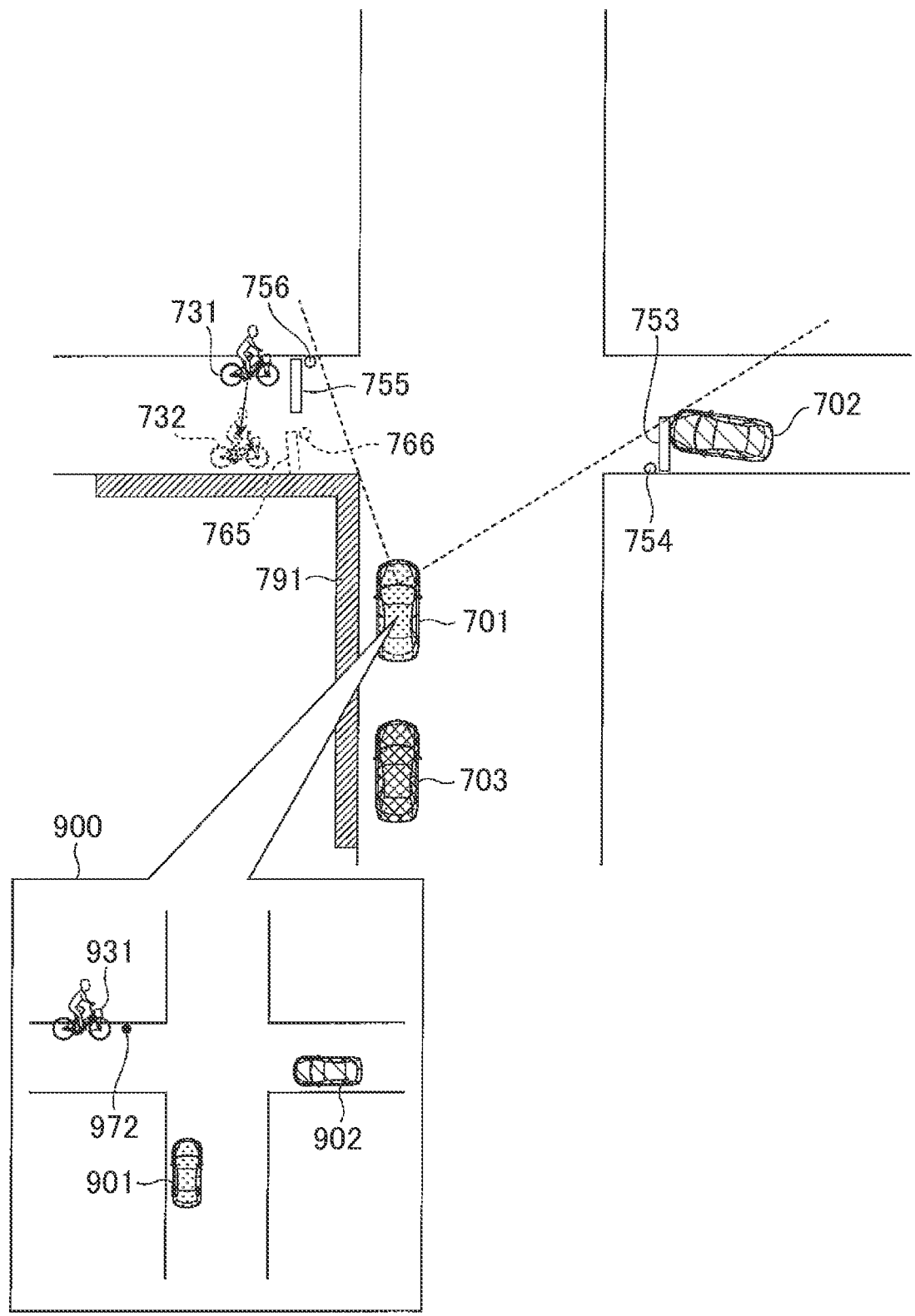
FIG. 11 illustrates an example of an intersection where no intersection mark exists.

FIG. 11 illustrates a situation which is almost the same as the intersection illustrated in FIG. 4 in the first embodiment but the intersection mark 751 does not exist, and the intersection mark feature point 752 as a reference feature point cannot be obtained. The second stop line 755 and the second supporting pillar root 756 as other reference feature points cannot be sensed from the outside sensor A 121 provided for the information processing device (type EB) 100B. Therefore, by the configuration of the first embodiment, a common reference feature point cannot be recognized in this situation by the information processing device (type FA) 300A and the information processing device (type EA) 100A, and the information processing device (type EA) 100A cannot correct the position information of the recognition result of the information processing device (type FA) 300A.

On the other hand, in the configuration of the second embodiment, regardless of sensing by the outside sensor A 121 provided for the information processing device (type EB) 100B, when the second stop line 755 and the second supporting pillar root 756 exist in the reference feature point map A 118, the position correction becomes possible, so that there are more cases which can be used than the first embodiment.

By adding the function of the information processing device (type FB) 300B to the information processing device (type EB) 100B and mounting the function in both of the first and second vehicles 701 and 702, the reference feature point and the position information of an object or indication can be transmitted to both of the vehicles, and the position information of the object or indication of another vehicle can be corrected and used in both of the vehicles like in the first embodiment. In a manner similar to the first embodiment, the information processing device (type EB) 100B can communicate with a plurality of information processing devices (type FB) 300B.

As described above, the information processing device (type EB) 100B of the second embodiment has: the receiving function (the communication processing unit A 151) of receiving configuration information (reference feature points) of an environmental map as a reference of position, which is extracted from sensing information of the outside sensor B 321 mounted in a second moving object or a stationary object (the second vehicle 702 or the intersection monitoring camera 811); the matching function (the reference feature point matching processing unit 161) of matching configuration information (reference feature point) of the environmental map obtained by the receiving function to configuration information (reference feature point) of an environmental map obtained by a function of the information processing device (type EB) 100B (in the embodiment, the reference feature point map A 118 having, as map data, configuration information of an environmental map as the reference of a position, the reference feature point selection processing unit AB 117 selecting a reference feature point existing in the map data, and the like); and a correcting function (the position correction processing unit A 171) of correcting position information of an object or an indication existing on the outside of the first moving object (the first vehicle 701) detected (sensed) by the external sensor B 321 mounted in the second moving object or a stationary object (the second vehicle 702 or the intersection monitoring camera 811) by using the matching result of the matching function.

Consequently, in addition to the fact that effects similar to those of the first embodiment are obtained, the number of scenes in which the device can be used increases, so that convenience improves.

Third Embodiment

A configuration example of function blocks of a third embodiment of the present invention will be described with reference to FIG. 12. The hardware configuration itself is almost the same as that described with reference to FIG. 2 in the first embodiment. The same reference numerals are designated to parts having the same functions as those in the first and second embodiments, repetitive description will not be given and, hereinafter, the different points will be mainly described.

Figure 12:
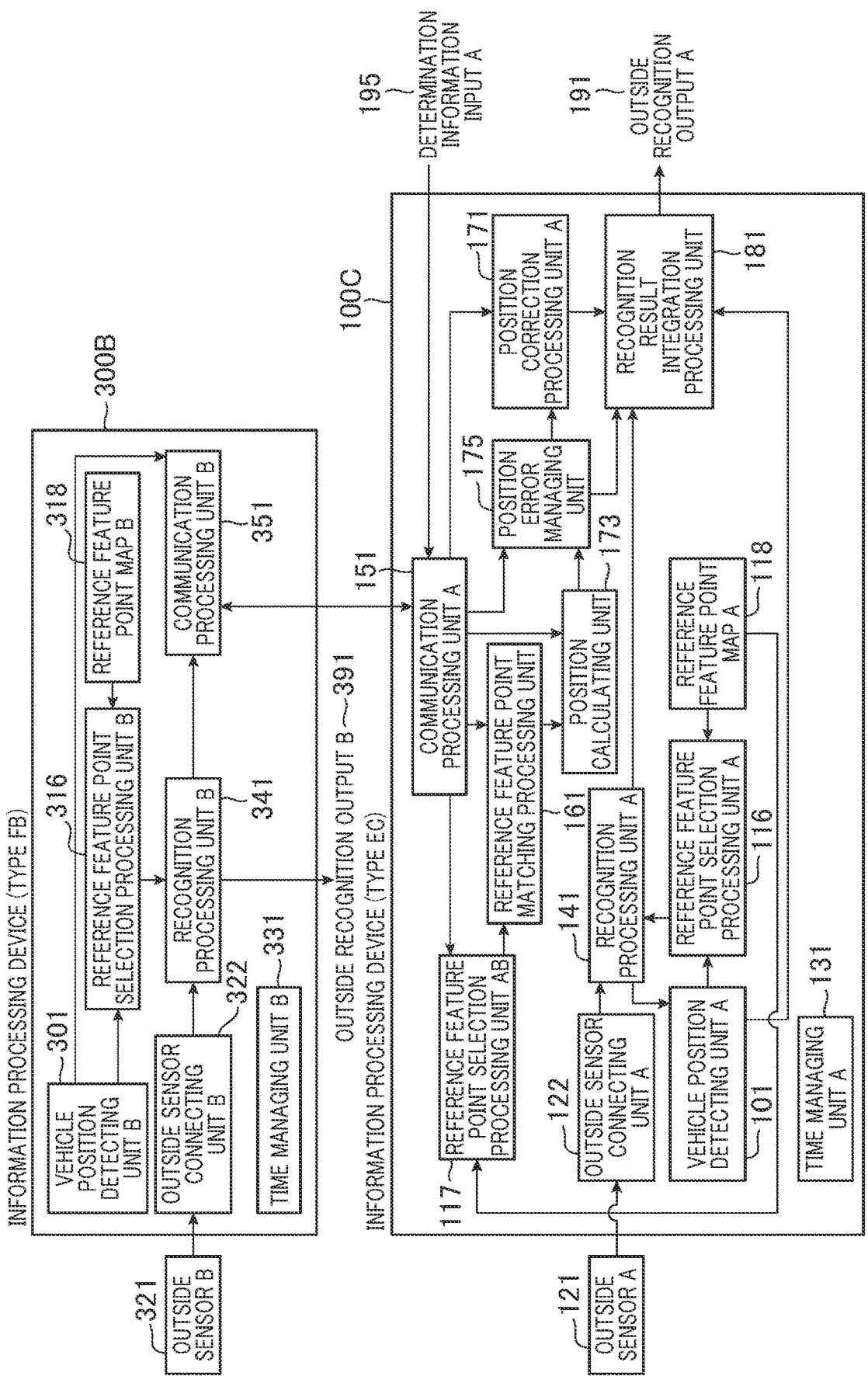
FIG. 12 illustrates a functional block configuration example of an information processing device (type FB) and an information processing device (type EC) of a third embodiment.

The third embodiment in FIG. 12 is illustrated on the basis of the configuration of the second embodiment and, obviously, can be applied similarly also to the configuration of the first embodiment.

In the third embodiment, the information processing device (type FB) 300B is the same as the second embodiment.

Figure 13:
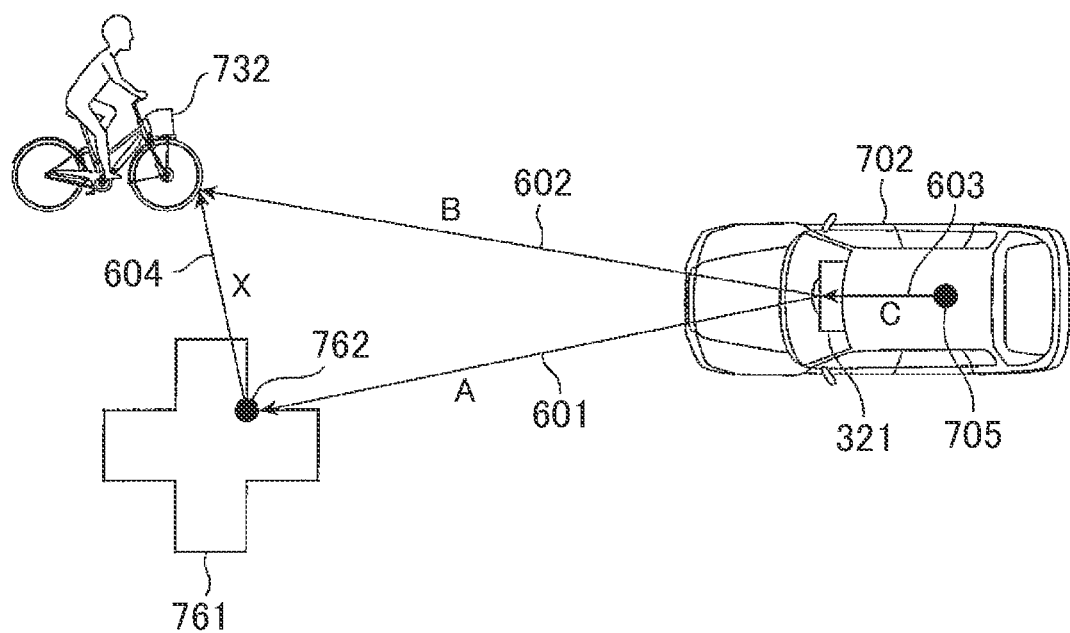
FIG. 13 is an explanatory diagram of an object detected by an information processing device mounted in another vehicle and a position correction processing method of the another vehicle.

In the information processing device (type FB) 300B, however, a vector C 603 indicating the relative position of the outside sensor B 321 to the position reference point 705 of the second vehicle 702 in which the device is mounted is included in transmission information from the communication processing unit B 351 (refer to FIG. 13). In the information processing device (type FB) 300B, the identification information of the second vehicle 702 in which the information processing device (type FB) 300B is mounted is also always included in transmission information.

The configuration of an information processing device (type EC) 100C will be described. The information processing device (type EC) 100C of the third embodiment is obtained by adding a position calculating unit 173 and a position error managing unit 175 to the configuration of the information processing device (type EB) 100B described in the second embodiment. An output of the reference feature point matching processing unit 161 is connected to the position calculating unit 173, not the position correction processing unit A 171.

The position calculating unit 173 is a part which calculates the position of the position reference point 705 of the vehicle 702 in which the information processing device (type FB) 300B is mounted on the basis of an output (matching result) of the reference feature point matching processing unit 161. The calculating method will be described with reference to FIG. 13. FIG. 13 corresponds to the situation of the intersection of FIG. 4.

From the information processing device (type FB) 300B, the vector A 601 indicating the relative position of the position-deviated intersection mark feature point 762 as the reference feature point from the outside sensor B 321 and the vector C 603 indicating the relative position from the position reference point 705 of the vehicle 702 to the outside sensor B 321 are transmitted. It is assumed that the same coordinate system as a reference of calculation of the vector A 601 and the vector C 603 is used.

The position calculating unit 173 obtains the position reference point 705 of the vehicle 702 corresponding to the reference feature point map A 118 by subtracting the vector A 601 and the vector C 603 from the position in the reference feature point map A 118 of the intersection mark feature point 752 corresponding to the position-deviated intersection mark feature point 762 as a reference feature point provided from the reference feature point matching processing unit 161.

The position error managing unit 175 compares the information of the position and orientation of each of vehicles transmitted from the vehicles and the information of the position and orientation of each of the vehicles output from the position calculating unit 173 every vehicle in which the information processing device (type FB) 300B is mounted and manages the maximum value of an error, the range of fluctuations in a recent predetermined period, the average value, and stability in a recent predetermined period of the average value. In the case where the maximum value of the error or the magnitude of the fluctuation become a predetermined value or larger, and in the case where the stability of the average value becomes a predetermined value or less, the position error managing unit 175 notifies the recognition result integration processing unit 181 not to use the information of the vehicle. In other words, the position error managing unit 175 checks information of an error of the position managed by the position error managing unit 175 and outputs the result of the check to the recognition result integration processing unit 181. The recognition result integration processing unit 181 selects a vehicle using information of an error of the position or the like on the basis of the output from the position error managing unit 175. The position error managing unit 175 transmits an average value to the position correction processing unit A 171.

The position correction processing unit A 171 corrects the position of an object or the like obtained from the information processing device (type FB) 300B by using an average value of position errors obtained from the position error managing unit 175 and transmits the corrected one to the recognition result integration processing unit 181. In the case where there is information of a reference feature point which is associated, the position of an object or the like may be corrected in a manner similar to the second embodiment.

In the case where there is no information of a reference feature point which is associated, that is, in the case where the vector A 601 is not obtained in the example illustrated in FIG. 13, correction using an average value of position errors obtained from the position error managing unit 175 is necessary. In this case, the position and the orientation of the vehicle 702 (the position of the position reference point 705) transmitted from the vehicle 702 in which the information processing device (type FB) 300B is mounted are corrected with an average value of position errors obtained from the position error managing unit 175, the corrected ones are used as a reference of the information of the position and the direction and, by using a value obtained by adding the vector B 602 and the vector C 603, the position of the bicycle 731 corresponding to the position-deviated bicycle 732, that is the corrected position is obtained.

The recognition result integration processing unit 181 basically performs the same operation as that in the second embodiment. However, as described above, the function of not using information from a vehicle instructed not to use from the position error managing unit 175 is added.

In the third embodiment, a position error can be managed by the position error managing unit 175 every vehicle which provides information, so that a vehicle whose position information is considered inaccurate can be detected, and position information included in recognition information of an object or an indication obtained from an information processing device whose precision is insufficient can be ignored. Since the position error managing unit 175 holds average values of position errors of vehicles, even in the case where there is no reference feature point at the timing when it is desired to perform position correction, the position correction can be performed by using the held data.

Figure 14:
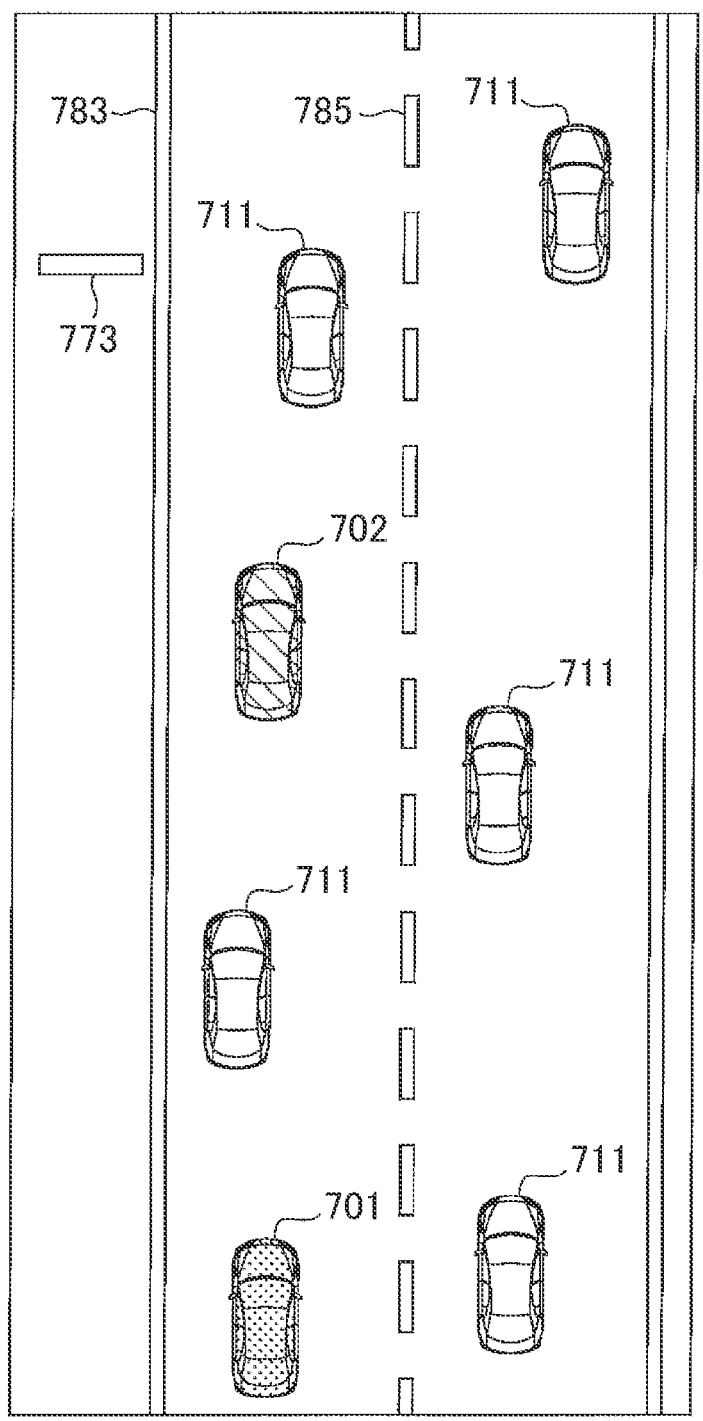
FIG. 14 illustrates an example of a situation where a vehicle in which an information processing device transmitting information of an object exists before a reference characteristic point.
Figure 15:
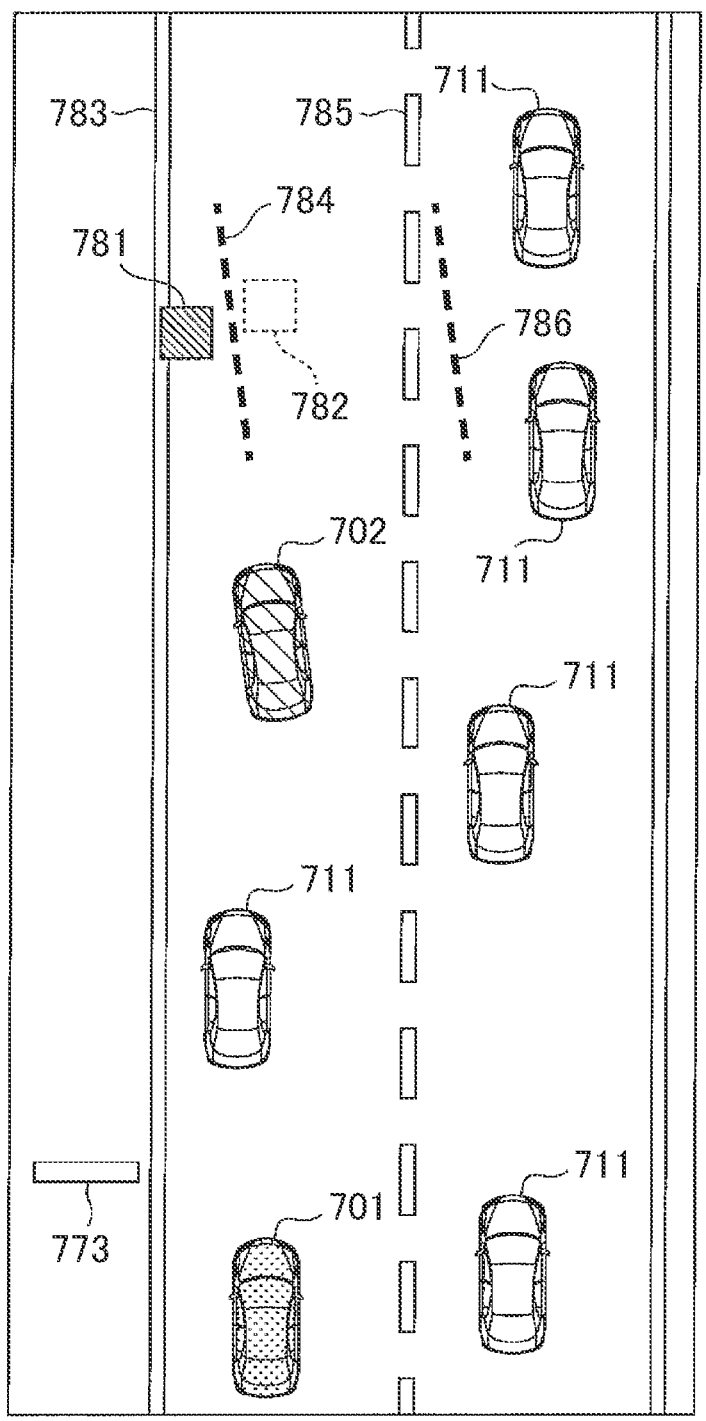
FIG. 15 illustrates an example of a situation where a fallen object is recognized after a vehicle in which an information processing device transmitting information of an object passes through a reference feature point.

For example, as illustrated in FIG. 14, a case is assumed such that the first vehicle 701 in which the information processing device (type EC) 100C is mounted exists in the rear of the second vehicle 702 in which the information processing device (type FB) 300B is mounted, and a plurality of peripheral vehicles 711 exist around the vehicles 701 and 702. In the diagram, 783 denotes a traffic lane (demarcation line) on the left side, 785 denotes a traffic lane (demarcation line) on the right side, and 773 denotes a third sign including a feature point. In this case, the information processing device (type EC) 100C calculates a position error of the second vehicle 702 by using the third sign 773 including a feature point as a reference feature point in front of the first vehicle 701 and the second vehicle 702 and manages it by the position error managing unit 175. After that, as illustrated in FIG. 15, in the case of detecting (recognizing) a fallen object 781 and notifying it in a place where the second vehicle 702 passes through the third sign 773 and the reference feature point cannot be detected, it is assumed that due to the influence of the position error of the second vehicle 702, the position of the fallen object 781 is transmitted as a position-deviated fallen object 782, the position of the traffic lane (demarcation line) 783 on the left side is transmitted as a position-deviated traffic lane (demarcation line) 784 on the left side, and the position of the traffic lane (demarcation line) 785 on the right side is transmitted as a position-deviated traffic lane (demarcation line) 786 on the right side, and (the information processing device (type EC) 100C) of the first vehicle 701 receives them. In the configuration of the first or second embodiment, in such a situation, there is no position information of the reference feature point and the position correction of the fallen object 781 cannot be performed. However, in the configuration of the third embodiment, the position correction of the fallen object 781 can be performed by the information calculated before and managed by the position error managing unit 175.

In a manner similar to the second embodiment, by adding the function of the information processing device (type FB) 300B to the information processing device (type EC) 100C and mounting the resultant in both of the first vehicle 701 and the second vehicle 702, the reference feature point and the position information of an object or indication can be transmitted to both of them, and the position information of an object or indication of another vehicle can be corrected and used in each of the vehicles. In addition, in a manner similar to the second embodiment, the information processing device (type EC) 100C can communicate with a plurality of information processing devices (type FB) 300B.

As described above, the information processing device (type EC) 100C of the third embodiment has, in a manner similar to the foregoing first and second embodiments, the receiving function (the communication processing unit A 151), the matching function (the reference feature point matching processing unit 161), and the correcting function (the position correction processing unit A 171).

The information processing device (type EC) 100C of the third embodiment has: the receiving function (the communication processing unit A 151) of receiving configuration information (reference feature points) of an environmental map as a reference of position, which is extracted from sensing information of the outside sensor B 321 mounted in a second moving object or a stationary object (the second vehicle 702 or the intersection monitoring camera 811) and position information of the second moving object or the stationary object (the second vehicle 702 or the intersection monitoring camera 811); the matching function (the reference feature point matching processing unit 161) of matching configuration information (reference feature point) of the environmental map obtained by the receiving function and configuration information (reference feature point) of an environmental map obtained by a function of the information processing device (type EC) 100C; a position calculating function (the position calculating unit 173) of calculating the position of the second moving object or the stationary object (the second vehicle 702 or the intersection monitoring camera 811) by using a matching result of the matching function; and an error detecting function (the position error managing unit 175) of detecting an error of the position of the second moving object or the stationary object (the second vehicle 702 or the intersection monitoring camera 811) recognized by the second moving object or the stationary object (the second vehicle 702 or the intersection monitoring camera 811) by comparing the calculation result of the position calculating function with the position information of the second moving object or the stationary object (the second vehicle 702 or the intersection monitoring camera 811) obtained by the receiving function.

The information processing device (type EC) 100C of the third embodiment also has the correcting function (the position correction processing unit A 171) of correcting the position information of an object or an indication existing on the outside of a first moving object (the first vehicle 701) detected by the outside sensor B 321 mounted in the second moving object or the stationary object (the second vehicle 702 or the intersection monitoring camera 811) by using the error detection result.

The information processing device (type EC) 100C of the third embodiment further has the error managing function (the position error managing unit 175) managing the error detection result, and further has: the correcting function (the position correction processing unit A 171) of correcting position information of an object or an indication existing on the outside of a first moving object (the first vehicle 701) detected by the outside sensor B 321 mounted in the second moving object or a stationary object (the second vehicle 702 or the intersection monitoring camera 811) by using an error of the position of the second moving object or the stationary object (the second vehicle 702 or the intersection monitoring camera 811) managed by the error managing function; and the selecting function (the recognition result integration processing unit 181) of checking information of the error of the position of the second moving object or the stationary object (the second vehicle 702 or the intersection monitoring camera 811) managed by the error managing function and selecting the second moving object or the stationary object (the second vehicle 702 or the intersection monitoring camera 811) using the information of the position error.

According to the third embodiment, in addition to the foregoing first and second embodiments, (the information processing device (type FB) 300B of) another vehicle transmits also the position information of the position of the another vehicle itself, and (the information processing device (type EC) 100C) of the present vehicle checks the error of the position information of the another vehicle grasped by the another vehicle itself from the position information of the another vehicle received, and the relation between the position of the of the feature point (reference feature point) detected by the another vehicle and the position of the feature point (reference feature point) grasped by the present vehicle and, when the error is large or unstable, avoids use of the position information from the another vehicle.

As described above, in the third embodiment, in addition that effects similar to those of the first and second embodiments are obtained, by comparing the position of another vehicle detected by the another vehicle itself and the position of the outside sensor B 321 mounted in the another vehicle calculated by the present vehicle, the position precision of the another vehicle is grasped. In such a manner, another vehicle which is improper for position information use can be detected. Consequently, by limiting use of the position information of a detected object or indication provided by the another vehicle and the position information of the another vehicle detected by the another vehicle itself, the adverse influence on the operation of the advanced safety system and the automatic driving system can be suppressed.

Fourth Embodiment

A configuration example of function blocks of a fourth embodiment of the present invention will be described with reference to FIG. 16. The hardware configuration itself is almost the same as that described with reference to FIG. 2 in the first embodiment. The same reference numerals are designated to parts having the same functions as those in the first, second, and third embodiments, repetitive description will not be given and, hereinafter, the different points will be mainly described.

The fourth embodiment in FIG. 16 is illustrated on the basis of the configurations of the second and third embodiments and, obviously, can be applied similarly also to the configuration of the first embodiment.

In the fourth embodiment, a part of the position information correcting function integrated in the information processing device (type EC) 100C as the side of receiving position information of an object or an indication in the third embodiment is moved to the information processing device (type FB) 300B on the side of transmitting position information of an object or an indication.

An information processing device (type FD) 300D of the fourth embodiment is obtained by adding a position correction processing unit B 371 to the information processing device (type FC) 300C described in the third embodiment. The position correction processing unit B 371 corrects information of the position and the orientation of a vehicle detected by the vehicle position detecting unit B 301 on the basis of deviation information (managed by the position error managing unit 175) of the position of the vehicle in which the information processing device (type FD) 300D is mounted, which is transmitted from the information processing device (type ED) 100D.

The information processing device (type ED) 100D is obtained by eliminating the position correction processing unit A 171 from the information processing device (type EC) 100C, enabling transmission/reception of information between the position error managing unit 175 and the communication processing unit A 151 in both directions, and information of a position error managed by the position error managing unit 175 can be transmitted to the information processing device (type FB) 300B side.

On the basis of the position error information detected on the side of the information processing device (type ED) 100D, the information of the position and the orientation of the vehicle detected by the vehicle position detecting unit B 301 is corrected on the side of the information processing device (type FD) 300D. Consequently, an object position detection error can be also suppressed, so that necessity of the position correcting process in the information processing device (type ED) 100D decreases. Since the position error information can be used on the information processing device (type FD) 300D side, in the case where a large error is notified from a plurality of vehicles, the information processing device (type FD) 300D determines that the possibility of occurrence of a trouble in the vehicle position detecting unit B 301 is high and can use the information for failure detection.

Also in the configuration of the fourth embodiment, there may be a case that the information processing device (type FD) 300D communicates with a plurality of vehicles in each of which the information processing device (type ED) 100D is mounted and, as a result, deviation information of the vehicle position from a certain vehicle in which the information processing device (type ED) 100D is mounted is ignored. Consequently, it is also considered to provide the position correcting function (the position correction processing unit A 171) also to the information processing device (type ED) 100D and perform position correction regardless of correction on the side of the information processing device (type FD) 300D.

As described above, the information processing device (type ED) 100D of the fourth embodiment has, in a manner similar to the foregoing third embodiment, the receiving function (the communication processing unit A 151), the matching function (the reference feature point matching processing unit 161), the position calculating function (the position calculating unit 173), the error detecting function (the position error managing unit 175), the error managing function (the position error managing unit 175), and the like and further has the transmitting function (the communication processing unit A 151) of transmitting information of an error of the position of the second moving object or the stationary object (the second vehicle 702 or the intersection monitoring camera 811) managed by the error managing function to the second moving object or the stationary object (the second vehicle 702 or the intersection monitoring camera 811).

Consequently, the effects similar to those of the foregoing first, second, and third embodiments are obtained and, in addition, simplification of the configuration of the information processing device (type ED) 100D, improvement of the reliability of the information processing device (type FD) 300D, and the like can be realized.

The present invention is not limited to the foregoing embodiments but includes various modifications. For example, the forgoing embodiments have been described to make the present invention easily understood and are not necessarily limited to a configuration having all of the components described. A part of the components of a certain embodiment can be replaced with a component of another embodiment, or a component of an embodiment can be added to the configuration of another embodiment. With respect to a part of the configuration of each embodiment, addition of another configuration, deletion, or replacement can be performed.

A part or all of the configurations, functions, processing units, processing means, and the like may be realized by hardware by, for example, designing by an integration circuit. The configurations, functions, and the like may be realized by software in a manner such that a processor interprets a program realizing each function and executes it. Information of a program, a table, a file, and the like realizing each function can be stored in a storing device such as a memory, a hard disk, an SSD (Solid State Drive) or the like or a recording medium such as an IC card, an SD card, a DVD, or the like.

The control lines and information lines illustrated are considered to be necessary for the description, and all of control lines and information lines necessary for a product are not always illustrated. It may be considered that almost all of the components are mutually connected in practice.

LIST OF REFERENCE SIGNS

11 . . . position information number
12 . . . sensor ID
13 . . . longitude offset
14 . . . latitude offset
15 . . . altitude offset
16 . . . object ID
17 . . . kind
18 . . . width
19 . . . height
20 . . . reliability
51 . . . third feature point
52 . . . fourth feature point
100A . . . information processing device (type EA) (outside sensing information processing device)
100B . . . information processing device (type EB) (outside sensing information processing device)
100C . . . information processing device (type EC) (outside sensing information processing device)
100D . . . information processing device (type ED) (outside sensing information processing device)
101 . . . vehicle position detecting unit A
111 . . . reference feature point extraction processing unit A
116 . . . reference feature point selection processing unit A
117 . . . reference feature point selection processing unit AB
118 . . . reference feature point map A
121 . . . outside sensor A
122 . . . outside sensor connecting unit A
131 . . . time managing unit A
141 . . . recognition processing unit A
151 . . . communication processing unit A
161 . . . reference feature point matching processing unit
171 . . . position correction processing unit A
173 . . . position calculating unit
175 . . . position error managing unit
181 . . . recognition result integration processing unit
191 . . . outside recognition output A
195 . . . determination information input A
200 . . . ECU
210 . . . microcomputer
221 . . . main storing device
226 . . . flash memory
231 . . . CAN transceiver
236 . . . sensor interface
237 . . . outside sensor module
241 . . . V2X module
242 . . . V2X antenna
246 . . . GPS module
251 . . . CAN bus
300A . . . information processing device (type FA)
300B . . . information processing device (type FB)
300D . . . information processing device (type FD)
301 . . . vehicle position detecting unit B
311 . . . reference feature point extraction processing unit B
316 . . . reference feature point selection processing unit B
318 . . . reference feature point map B
321 . . . outside sensor B
322 . . . outside sensor connecting unit B
331 . . . time managing unit B
341 . . . recognition processing unit B
351 . . . communication processing unit B
371 . . . position correction processing unit B
391 . . . outside recognition output B
601 . . . vector A
602 . . . vector B
603 . . . vector C
604 . . . vector X
701 . . . first vehicle
702 . . . second vehicle
703 . . . third vehicle
711 . . . peripheral vehicle
723 . . . part closest to ground of sign plate
725 . . . sign plate
727 . . . supporting pillar
731 . . . bicycle
732 . . . position-deviated bicycle
751 . . . intersection mark
752 . . . intersection mark feature point
753 . . . first stop line
754 . . . root of first supporting pillar
755 . . . second stop line
756 . . . root of second supporting pillar
761 . . . position-deviated intersection mark
762 . . . position-deviated intersection mark feature point
765 . . . position-deviated second stop line
766 . . . root of position-deviated second supporting pillar
773 . . . sign
781 . . . fallen object
782 . . . position-deviated fallen object
783 . . . traffic lane on the left side
784 . . . position-deviated traffic lane on the left side
785 . . . traffic lane on the right side
786 . . . position-deviated traffic lane on the right side
791 . . . wall
811 . . . intersection monitoring camera
900 . . . environmental map
901 . . . first vehicle on environmental map
902 . . . second vehicle on environmental map
931 . . . bicycle on environmental map
951 . . . intersection mark on environmental map
952 . . . intersection mark feature point on environmental map

The invention claimed is:

1. An outside sensing information processing device detecting position of an object or a visually perceivable feature of an object existing on the outside of a first moving object, comprising:
a receiving function of receiving configuration information of an environmental map as a position reference, which is extracted from sensing information by an outside sensor mounted in a second moving object or a stationary object;
a matching function matching between configuration information of the environmental map obtained by the receiving function and configuration information of an environmental map obtained by the function of the sensing information processing device;

a correcting function, by using a matching result of the matching function, correcting position information of the object or the visually perceivable feature of the object existing on the outside detected by the outside sensor mounted in the second moving object or the stationary object;

a time managing function time synchronizing the outside sensing information processing device with the outside sensor mounted in the second moving object or the stationary object;

wherein when motion of an outside sensor mounted in the second moving object or the stationary object stops, an interval of the process of matching the configuration information of the environmental map is made longer stopped, until the outside sensor mounted in the second moving object or the stationary object starts moving.

2. The outside sensing information processing device according to claim 1, wherein in the case of receiving sensing information by outside sensors mounted in a plurality of second moving objects or stationary objects, when the first moving object approaches an intersection, the sensing information by the outside sensor mounted in the second moving object or stationary object facing towards the intersection and closest to the intersection in each of roads gathered at the intersection is used.

3. The outside sensing information processing device according to claim 2, wherein the sensing information obtained by the outside sensor mounted in the second moving object or stationary object oriented in a direction orthogonal to the orientation of the first moving object is used.

4. The outside sensing information processing device according to claim 1, wherein the matching process of configuration information of an environmental map is performed by using position information of a reference feature point as configuration information of an environmental map as the position reference, which is extracted from sensing information obtained by the outside sensor mounted in the first moving object, or having, as map data, configuration information of an environmental map as the position reference and using position information of a reference feature point existing in the map data.

5. An outside sensing information processing device detecting position of an object or a visually perceivable feature of an object existing on the outside of a first moving object, comprising:

a receiving function of receiving configuration information of an environmental map as a position reference, which is extracted from sensing information obtained by an outside sensor mounted in a second moving object or a stationary object and position information of the second moving object or the stationary object;

a matching function of matching configuration information of the environmental map obtained by the receiving function to configuration information of an environmental map obtained by the function of the sensing information processing device;

a position calculating function of calculating the position of the second moving object or the stationary object by using a matching result of the matching function;

an error detecting function of detecting an error of a position of the second moving object or the stationary object recognized by the second moving object or the stationary object by comparing a calculation result of the position calculating function and position information of the second moving object or the stationary object obtained by the receiving function;

a time managing function time synchronizing the outside sensing information processing device with the outside sensor mounted in the second moving object or the stationary object;

wherein when motion of an outside sensor mounted in the second moving object or the stationary object stops an interval of the process of matching the configuration information of the environmental map is made longer until the outside sensor mounted in the second moving object or the stationary object starts moving.

6. The outside sensing information processing device according to claim 5, wherein the matching process of the configuration information of the environmental map is performed by using position information of a reference feature point as configuration information of an environmental map as the position reference, which is extracted from sensing information obtained by the outside sensor mounted in the first moving object, or having, as map data, configuration information of an environmental map as the position reference and using position information of a reference feature point existing in the map data.

7. The outside sensing information processing device according to claim 5, further comprising a correcting function of correcting position information of the object or visually perceivable feature of the object existing on the outside detected by an outside sensor mounted in the second moving object or the stationary object by using an error detection result of detection of an error of the position of the second moving object or stationary object.

8. The outside sensing information processing device according to claim 5, further comprising an error managing function of managing an error detection result of detecting an error of position of the second moving object or the stationary object.

9. The outside sensing information processing device according to claim 8, further comprising a correcting function of correcting position information of the object or visually perceivable feature of the object existing on the outside detected by an outside sensor mounted in the second moving object or the stationary object by using an error of the position of the second moving object or the stationary object managed by the error managing function.

10. The outside sensing information processing device according to claim 5, wherein in the case of receiving sensing information obtained by outside sensors mounted in a plurality of second moving objects or stationary objects, when the first moving object approaches an intersection, the sensing information by the outside sensor mounted in the second moving object or the stationary object facing towards the intersection and closest to the intersection in each of roads gathered at the intersection is processed.

11. The outside sensing information processing device according to claim 10, wherein the sensing information obtained by the outside sensor mounted in the second moving object or stationary object oriented in a direction almost orthogonal to the orientation of the first moving object is processed.

12. The outside sensing information processing device according to claim 8, further comprising a transmitting function of transmitting information of an error of the position of the second moving object or the stationary object managed by the error managing function to the second moving object or the stationary object.

13. The outside sensing information processing device according to claim 8, further comprising a selecting function, in the case of receiving sensing information obtained by outside sensors mounted in a plurality of second moving objects or stationary objects, of checking information of an error of the position of the second moving object or the stationary object managed by the error managing function and selecting the second moving object or the stationary object using the information of the position error.

* * * * *